United States Patent
Yagi et al.

(10) Patent No.: US 10,487,210 B2
(45) Date of Patent: Nov. 26, 2019

(54) COLORING COMPOSITION FOR TEXTILE PRINTING, TEXTILE PRINTING METHOD, INK FOR INK JET TEXTILE PRINTING, AND DYED FABRIC

(71) Applicant: FUJIFILM Corporation, Minato-ku, Tokyo (JP)

(72) Inventors: Kazunari Yagi, Kanagawa (JP); Keiichi Tateishi, Kanagawa (JP); Takashi Iizumi, Kanagawa (JP); Akihiro Hakamata, Kanagawa (JP); Yoshihiko Fujie, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 216 days.

(21) Appl. No.: 15/592,749

(22) Filed: May 11, 2017

(65) Prior Publication Data

US 2017/0247544 A1    Aug. 31, 2017

Related U.S. Application Data

(63) Continuation of application No. PCT/JP2015/082592, filed on Nov. 19, 2015.

(30) Foreign Application Priority Data

Nov. 25, 2014 (JP) .................. 2014-237961
Aug. 31, 2015 (JP) .................. 2015-171439

(51) Int. Cl.
  *C09B 11/28* (2006.01)
  *D06P 3/24* (2006.01)
  (Continued)

(52) U.S. Cl.
  CPC ............ *C09B 11/28* (2013.01); *B41J 2/21* (2013.01); *B41J 3/4078* (2013.01); *B41M 5/52* (2013.01);
  (Continued)

(58) Field of Classification Search
  CPC ......... C09B 11/24; C09B 11/28; C09B 67/20; C09D 11/00; C09D 11/328; C09D 11/32;
  (Continued)

(56) References Cited

U.S. PATENT DOCUMENTS 6,365,721 B1    4/2002 Engel
6,485,551 B1    11/2002 Kohsaka et al.
(Continued)

FOREIGN PATENT DOCUMENTS

CN    104011142 A    8/2014
EP     1079019 A2    2/2001
(Continued)

OTHER PUBLICATIONS

Communication dated Nov. 7, 2017, from the Japanese Patent Office in counterpart application No. 2016-561541.
(Continued)

*Primary Examiner* — Camie S Thompson
(74) *Attorney, Agent, or Firm* — Sughrue Mion, PLLC

(57) ABSTRACT

Provided are: a coloring composition for dyeing including a compound represented by Formula (1) shown in this specification or a salt thereof; a coloring composition for textile printing in which the coloring composition for dyeing is used for textile printing; a compound which is preferable as a material of the coloring compositions; a textile printing method in which the above-described coloring composition for textile printing is used; an ink for ink jet textile printing including the above-described coloring composition for textile printing; and a dyed fabric.

11 Claims, 1 Drawing Sheet

(51) Int. Cl.
*B41M 5/52* (2006.01)
*C09D 11/328* (2014.01)
*B41J 2/21* (2006.01)
*B41J 3/407* (2006.01)
*D06P 1/40* (2006.01)

(52) U.S. Cl.
CPC .............. *C09D 11/328* (2013.01); *D06P 1/40* (2013.01); *D06P 3/241* (2013.01)

(58) Field of Classification Search
CPC ... C09D 11/54; D06P 1/00; D06P 3/04; D06P 3/241; D06P 5/00; D06P 1/40; D06P 3/06; B41J 2/01; B41J 2/21; B41J 2/15; B41J 2/2114; B41J 3/4078; B41M 5/00; B41M 5/50; B41M 5/52; B41M 5/0017; B41M 5/5227
USPC ......... 106/31.47, 31.48, 503, 31.43; 347/20; 549/226; 8/637.1, 624, 642
See application file for complete search history.

(56) References Cited

U.S. PATENT DOCUMENTS

| | | | |
|---|---|---|---|
| 2005/0036018 A1 | 2/2005 | Yanagihara et al. | |
| 2014/0305336 A1 | 10/2014 | Fujie et al. | |
| 2015/0037546 A1* | 2/2015 | Yagi ........................... | B41J 2/01 428/196 |

FOREIGN PATENT DOCUMENTS

| | | |
|---|---|---|
| GB | 749308 A | 3/1956 |
| GB | 1 409 493 A | 10/1975 |
| GB | 2134129 A | 8/1984 |
| JP | 51103129 A | 9/1976 |
| JP | 6067575 A | 4/1985 |
| JP | 9255882 A | 9/1997 |
| JP | 1129714 A | 2/1999 |
| JP | 2939908 B2 | 8/1999 |
| JP | 2001131882 A | 5/2001 |
| JP | 2002348502 A | 12/2002 |
| JP | 2007239152 A | 9/2007 |
| JP | 4750981 B2 | 8/2011 |
| JP | 2013133394 A | 7/2013 |
| JP | 2013133395 A | 7/2013 |
| JP | 2013133396 A | 7/2013 |
| JP | 2013133397 A | 7/2013 |
| JP | 201462142 A | 4/2014 |

OTHER PUBLICATIONS

Extended Extended Search Report dated Aug. 4, 2017 by the European Patent Office in counterpart European Patent Application No. 15863010.3.
Communication dated Aug. 3, 2018, issued by the State Intellectual Property Office of P.R. China in counterpart Chinese Application No. 201580061702.3.
International Search Report dated Jan. 26, 2016, by the International Searching Authority in counterpart International Application No. PCT/JP2015/082592 (PCT/ISA/210).
Written Opinion dated Jan. 26, 2016, by the International Searching Authority in counterpart International Application No. PCT/JP2015/082592 (PCT/ISA/237).
International Preliminary Report on Patentability(Chapter II of the Patent Cooperation Treaty), dated Dec. 21, 2016, issued by the International Searching Authority in counterpart International Application No. PCT/JP2015/082592, (PCT/IPEA/409).
PCT/IPEA/408 dated Oct. 11, 2016, issued by the International Searching Authority in counterpart International Application No. PCT/JP2015/082592.
Partial translation of Written Opinion dated Jan. 26, 2016, by the International Searching Authority in counterpart International Application No. PCT/JP2015/082592 (PCT/ISA/237), which was cited as cite No. 22 in IDS filed on May 11, 2017.
English Abstract of JP 51-103129, which was cited as cite No. 19 in IDS filed on May 11, 2017.
Office Action dated Feb. 14, 2019, from the State Intellectual Property Office of People's Republic of China in counterpart Chinese Application No. 201580061702.3.

* cited by examiner

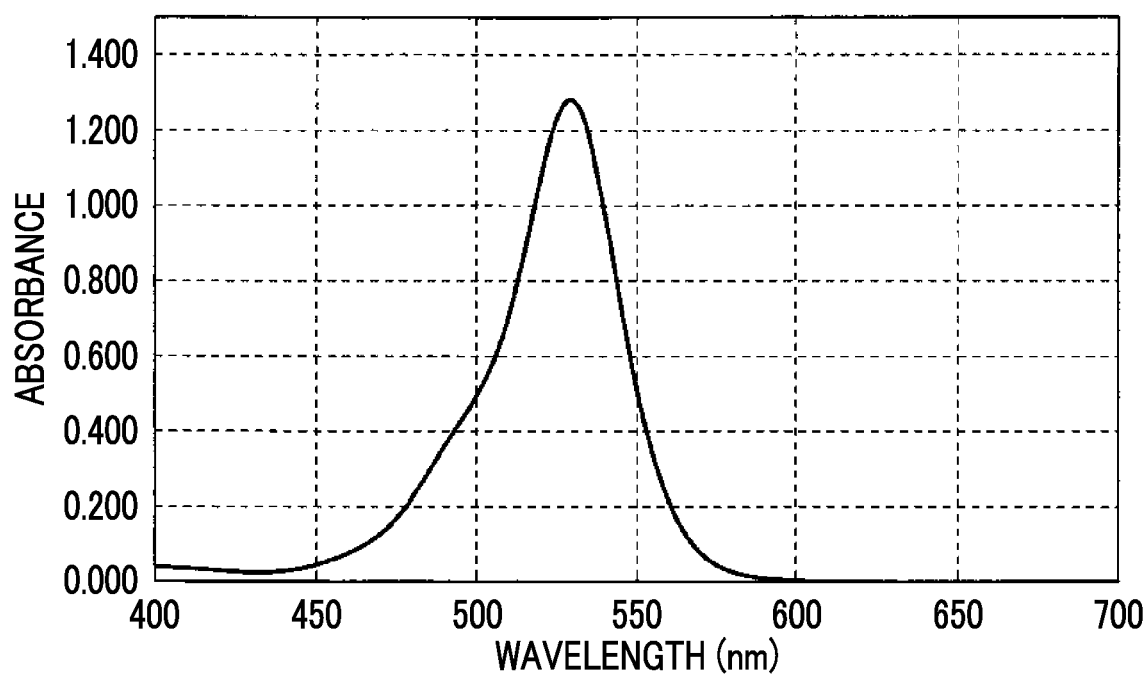

COLORING COMPOSITION FOR TEXTILE PRINTING, TEXTILE PRINTING METHOD, INK FOR INK JET TEXTILE PRINTING, AND DYED FABRIC

CROSS REFERENCE TO RELATED APPLICATION(S)

This is a continuation of International Application No. PCT/JP2015/082592 filed on Nov. 19, 2015, and claims priorities from Japanese Patent Application No. 2014-237961 filed on Nov. 25, 2014 and Japanese Patent Application No. 2015-171439 filed on Aug. 31, 2015, the entire disclosures of which are incorporated herein by reference.

BACKGROUND OF THE INVENTION

1. Field of the Invention

The present invention relates to a coloring composition for dyeing, a coloring composition for textile printing, a textile printing method, an ink for ink jet textile printing, and a dyed fabric.

2. Description of the Related Art

In the related art, as a dye for dyeing fabric, for example, an acid dye, a reactive dye, a direct dye, or a dispersed dye is used. As a dye for dyeing cellulose fibers such as cotton or viscose rayon, for example, a reactive dye, a direct dye, a sulfur dye, a vat dye, or a naphthol dye is known. As a dye for dyeing polyamide fibers such as silk, wool, or nylon, for example, an acid dye, an acid metal complex dye, an acid mordant dye, or a direct dye is known. Regarding ester fibers such as polyester fiber or cellulose ester fiber, it is known that a dispersed dye or a pigment is used for dyeing. In addition, acrylic fibers are generally dyed with a cationic dye. However, some acrylic fibers are dyed with an acid dye.

As dyes, various color dyes can be used. In particular, for magenta, JP4750981B describes a monoazo dye, and JP1999-029714A (JP-H11-029714A) describes an anthrapyridone dye.

In addition, as an industrial dyeing method for dyeing fabric, for example, screen printing, roller printing, or transfer printing has been used until now. These methods are dyeing techniques in which a series of steps including, for example, a step of planning a design pattern, an engraving or plate-making step, a step of preparing a printing paste, and a step of preparing a textile are integrated.

On the other hand, ink jet textile printing in which an ink jet method capable of directly supplying a dye to fabric is used has been proposed. Ink jet textile printing has advantageous effects in that, unlike textile printing of the related art, it is not necessary to make a plate and an image having excellent tone characteristics can be rapidly formed. Therefore, there are merits in that, for example, the delivery time can be reduced, many kinds in small quantities can be produced, and a plate-making step is unnecessary. Further, in ink jet textile printing, only an amount of ink required for forming an image is used. Therefore, it can be said that ink jet textile printing is an image forming method having excellent environmental friendliness in that, for example, the amount of waste liquid is less than that in a method of the related art.

JP2939908B describes a method of, using ink jet textile printing, designing a pattern suitable for a three-dimensional shape of a garment and rapidly reproducing the design image on a textile without deterioration.

In addition, JP2002-348502A describes an example in which a specific xanthene dye (Acid Red 289) is used in an ink jet textile printing method.

On the other hand, JP1997-255882A (JP-H9-255882A) describes a xanthene compound which is substituted with a branched alkyl group at a specific substitution site, and also describes an ink jet recording solution including this compound.

SUMMARY OF THE INVENTION

However, the dyes described in JP4750981B and JP1999-029714A (JP-H11-029714A) are strongly reddish compared to magenta and are insufficient in vividness. On the other hand, a dye having a xanthene skeleton which is known as, for example, Acid Red 52 or Acid Red 289 exhibits a vivid magenta color, and fabric can be dyed with this dye with a high density. In JP2002-348502A, fabric is printed using Acid Red 289. However, this dye is insufficient in light fastness and wet fastness. In addition, in a case where wet fastness is insufficient in ink jet textile printing, there is a problem in that image bleeding occurs.

The xanthene compound described in JP1997-255882A (JP-H9-255882A) which is substituted with branched alkyl at a specific site has light fastness of an image printed on ink jet image receiving paper. However, in JP1997-255882A (JP-H9-255882A), issues (in particular, light fastness) arising in a case where the xanthene compound is used for dyeing fabric are not discussed.

Therefore, a coloring composition for dyeing, which has excellent fixing properties and with which dyed fabric having excellent performance such as light fastness or wet fastness can be obtained, is required. In particular, in a case where a fine image is printed, there is a problem in that image bleeding occurs in a printing step after a steam treatment step and a water washing step, and currently further improvement is required.

An object of the present invention is to provide a coloring composition for dyeing having an excellent color, a high color optical density, excellent fixing properties, reduced bleeding, and excellent light fastness; a coloring composition for textile printing in which the coloring composition for dyeing is used for textile printing; and a compound which is preferable as a material of the coloring compositions. In addition, another object of the present invention is to provide a textile printing method in which the above-described coloring composition for textile printing is used, an ink for ink jet textile printing including the above-described coloring composition for textile printing, and a dyed fabric.

That is, the present invention is as follows.

[1] A coloring composition for dyeing comprising a compound represented by the following Formula (1) or a salt of the compound represented by the following Formula (1),

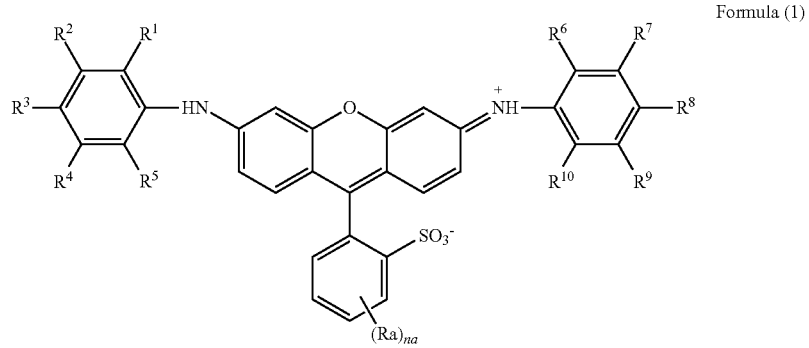

Formula (1)

in Formula (1), $R^1$, $R^5$, $R^6$, and $R^{10}$ each independently represent an unsubstituted alkyl group, $R^2$, $R^3$, $R^4$, $R^7$, $R^8$, and $R^9$ each independently represent a hydrogen atom, an unsubstituted alkyl group, or a sulfo group, the total number of carbon atoms in unsubstituted alkyl groups represented by $R^1$ to $R^5$ and the total number of carbon atoms in unsubstituted alkyl groups represented by $R^6$ to $R^{10}$ are 3 or more, any one of $R^2$, $R^3$, $R^4$, $R^7$, $R^8$, and $R^9$ represents a sulfo group, Ra represents a substituent, and na represents 0 to 4.

[2] The coloring composition for dyeing according to [1], in which the total number of carbon atoms in unsubstituted alkyl groups represented by $R^1$ to $R^5$ and the total number of carbon atoms in unsubstituted alkyl groups represented by $R^6$ to $R^{10}$ are 5 or more.

[3] The coloring composition for dyeing according to [1] or [2], in which $R^3$ and $R^8$ each independently represent an unsubstituted alkyl group or a sulfo group.

[4] The coloring composition for dyeing according to any one of [1] to [3], in which the compound represented by Formula (1) or the salt of the compound represented by Formula (1) has 1 to 4 sulfo groups.

[5] The coloring composition for dyeing according to any one of [1] to [4], in which 10 mol % or higher of cations included in sulfo groups represented by $R^2$, $R^3$, $R^4$, $R^7$, $R^8$, and $R^9$ and cations included in an ionic hydrophilic group represented by Ra are lithium ions.

[6] The coloring composition for dyeing according to any one of [1] to [5], in which 25 mol % or higher of cations included in sulfo groups represented by $R^2$, $R^3$, $R^4$, $R^7$, $R^8$, and $R^9$ and cations included in an ionic hydrophilic group represented by Ra are lithium ions.

[7] The coloring composition for dyeing according to any one of [1] to [6], in which 10 mol % or higher of all the cations included in the coloring composition for dyeing excluding cations of a cationic chromophore are lithium ions.

[8] A coloring composition for textile printing which is the coloring composition for dyeing according to any one of [1] to [7].

[9] A textile printing method comprising the following steps (1) to (4):
(1) a step of preparing a color paste by adding the coloring composition for textile printing according to [8] to a solution including at least a polymer compound and water;
(2) a step of printing the color paste of (1) on fabric;
(3) a step of applying steam to the printed fabric; and
(4) a step of washing the printed fabric with water and drying the washed fabric.

[10] An ink for ink jet textile printing comprising the coloring composition for textile printing according to [8].

[11] A textile printing method of printing the ink for ink jet textile printing according to [10] on fabric using an ink jet method.

[12] The textile printing method according to [11] comprising the following steps (11) to (14):
(11) a step of applying a paste including at least a polymer compound and water to fabric;
(12) a step of printing the ink for ink jet textile printing according to [10] on the fabric using an ink jet method;
(13) a step of applying steam to the printed fabric; and
(14) a step of washing the printed fabric with water and drying the washed fabric.

[13] The textile printing method according to any one of [9], [11], and [12], in which the fabric includes polyamide.

[14] A fabric which is dyed using the coloring composition for dyeing according to any one of [1] to [7] or the coloring composition for textile printing according to [8].

[15] A fabric which is printed using the textile printing method according to any one of [9], [11], [12], and [13].

[16] A compound represented by any one of the following Formulae (1-1) to (1-6) and (1-1Li) to (1-6Li).

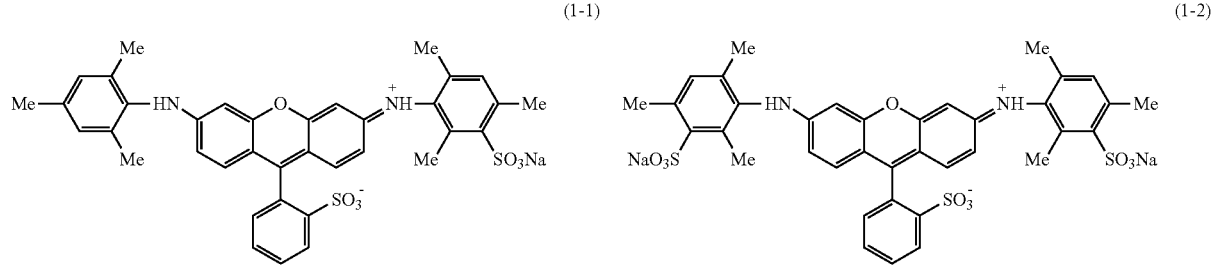

(1-1)      (1-2)

-continued
(1-3)
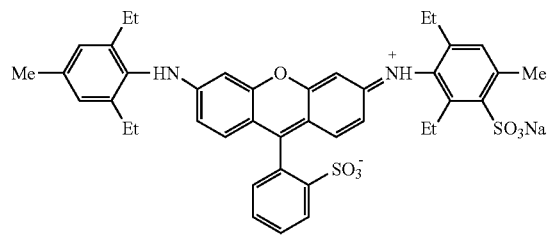
(1-4)
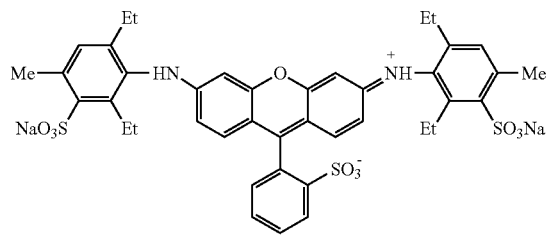
(1-5)
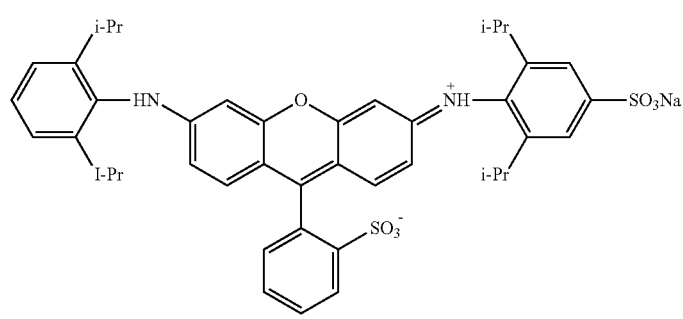
(1-6)
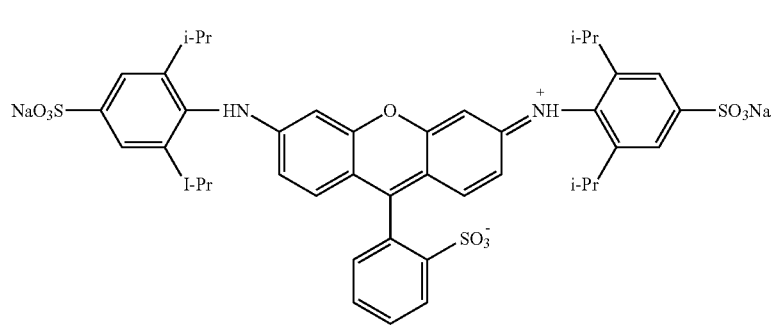
(1-1Li)
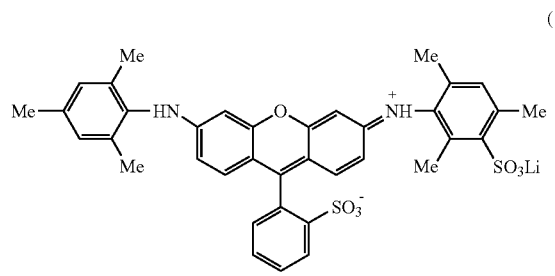
(1-2Li)
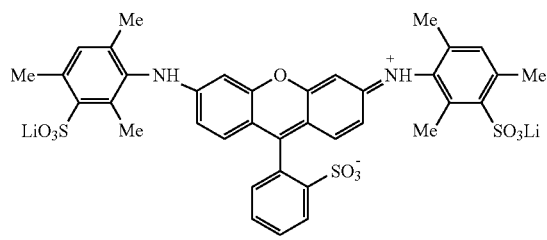
(1-3Li)
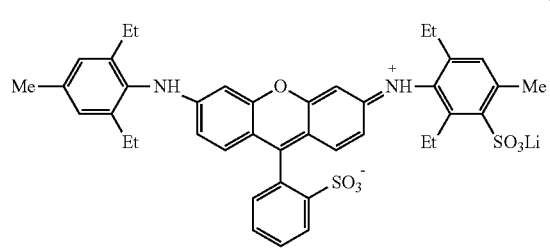
(1-4Li)
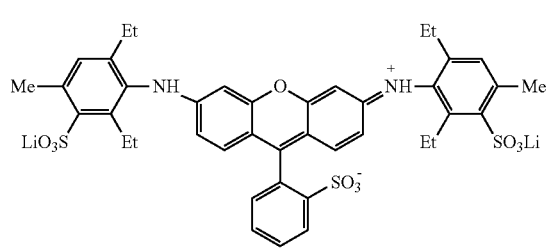

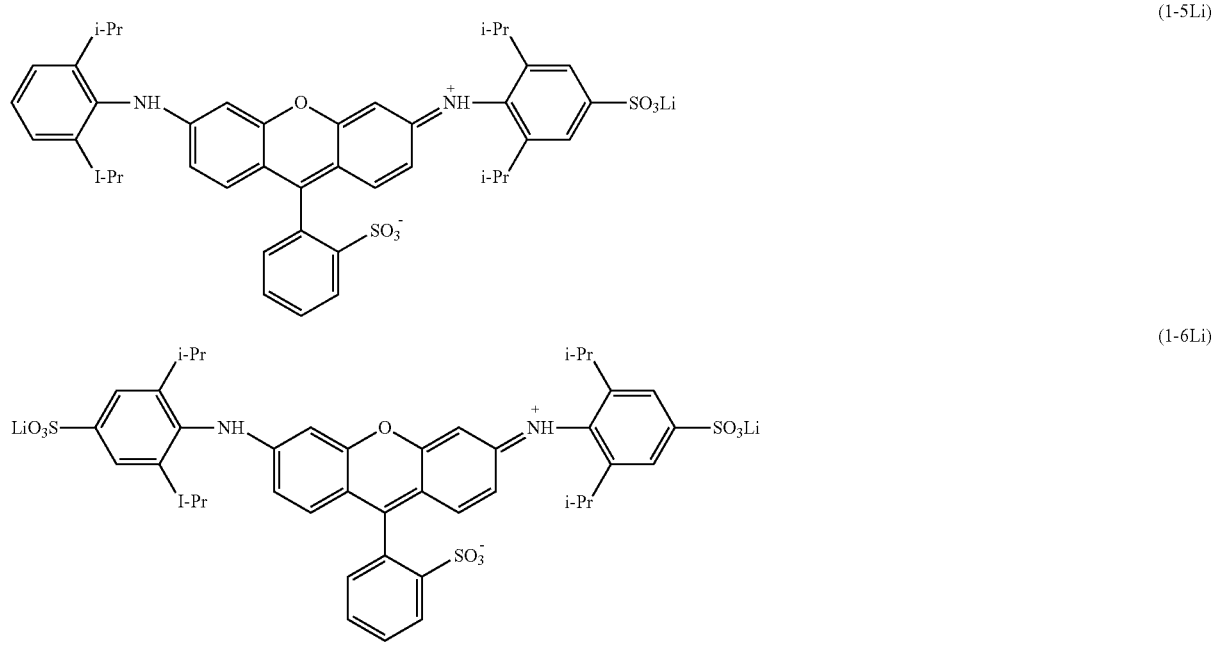

According to the present invention, a coloring composition for dyeing or textile printing having an excellent color, a high color optical density, reduced bleeding, and excellent light fastness can be provided. In addition, an ink for ink jet textile printing including the above-described coloring composition for dyeing or textile printing, a method of printing on fabric, and a dyed or printed fabric can be provided.

BRIEF DESCRIPTION OF THE DRAWING

FIG. 1 is a graph showing an absorption spectrum in a dilute aqueous solution of Exemplary Compound (1-1).

DESCRIPTION OF THE PREFERRED EMBODIMENTS

Hereinafter, the present invention will be described in detail.

First, specific examples of a substituent in the present invention are defined as a substituent group A.
(Substituent Group A)

Examples of the substituent group A includes a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a heterocyclic thio group, a sulfamoyl group, an alkyl- or aryl-sulfinyl group, an alkyl- or aryl-sulfonyl group, an acyl group, an aryloxycarbonyl group, an alkoxycarbonyl group, a carbamoyl group, an aryl or heterocyclic azo group, an imido group, a phosphino group, a phosphinyl group, a phosphinyloxy group, a phosphinylamino group, a silyl group, and an ionic hydrophilic group. These substituents may further have a substituent, and examples of this substituent include a group selected from the above-described substituent group A.

Examples of the halogen atom include a fluorine atom, a chlorine atom, a bromine atom, and an iodine atom.

Examples of the alkyl group include a linear, branched, or cyclic substituted or unsubstituted alkyl group. In addition, a cycloalkyl group, a bicycloalkyl group, a tricyclo structure and the like having many ring structures are also included. Alkyl groups (for example, an alkyl group of an alkoxy group or an alkylthio group) in substituents described below are also included in the examples of the above-described alkyl group.

As the alkyl group, an alkyl group having 1 to 30 carbon atoms is preferable, and examples thereof include a methyl group, an ethyl group, a n-propyl group, an i-propyl group, a t-butyl group, a n-octyl group, an eicosyl group, a 2-chloroethyl group, a 2-cyanoethyl group, and a 2-ethylhexyl group. As the cycloalkyl group, a substituted or unsubstituted cycloalkyl group having 3 to 30 carbon atoms is preferable, and examples thereof include a cyclohexyl group, a cyclopentyl group, and a 4-n-dodecylcyclohexyl group. As the bicycloalkyl group, a substituted or unsubstituted bicycloalkyl group having 5 to 30 carbon atoms is preferable, that is, a monovalent group obtained by removing one hydrogen atom from bicycloalkane having 5 to 30 carbon atoms is preferable, and examples thereof include a bicyclo[1,2,2]heptan-2-yl group and a bicyclo[2,2,2]octan-3-yl group.

Examples of the aralkyl group include a substituted or unsubstituted aralkyl group. As the substituted or unsubstituted aralkyl group, an aralkyl group having 7 to 30 carbon atoms is preferable, and examples thereof include a benzyl group and a 2-phenethyl group.

Examples of the alkenyl group include a linear, branched, or cyclic substituted or unsubstituted alkenyl group. In addition, a cycloalkenyl group and a bicycloalkenyl group are also included.

As the alkenyl group, a substituted or unsubstituted alkenyl group having 2 to 30 carbon atoms is preferable, and examples thereof include a vinyl group, an allyl group, a prenyl group, a geranyl group, and an oleyl group. As the cycloalkenyl group, a substituted or unsubstituted cycloalkenyl group having 3 to 30 carbon atoms is preferable, that is, a monovalent group obtained by removing one hydrogen atom from cycloalkene having 3 to 30 carbon atoms is preferable, and examples thereof include a 2-cyclopenten-1-yl group and a 2-cyclohexen-1-yl group. As the bicycloalkenyl group, a substituted or unsubstituted bicycloalkenyl group can be used. A substituted or unsubstituted bicycloalkenyl group having 5 to 30 carbon atoms is preferable, that is, a monovalent group obtained by removing one hydrogen atom from bicycloalkene having one double bond is preferable, and examples thereof include a bicyclo[2,2,1]hept-2-en-1-yl group and a bicyclo[2,2,2]oct-2-en-4-yl group.

As the alkynyl group, a substituted or unsubstituted alkynyl group having 2 to 30 carbon atoms is preferable, and examples thereof include an ethynyl group, a propargyl group, and a trimethylsilylethynyl group.

As the aryl group, a substituted or unsubstituted aryl group having 6 to 30 carbon atoms is preferable, and examples thereof include a phenyl group, a p-tolyl group, a naphthyl group, a m-chlorophenyl group, an o-hexadecanoylaminophenyl group.

As the heterocyclic group, a monovalent group obtained by removing one hydrogen atom from a 5- or 6-membered substituted or unsubstituted aromatic or nonaromatic heterocyclic compound is preferable, and a 5- or 6-membered aromatic heterocyclic group having 3 to 30 carbon atoms is more preferable, and examples thereof include a 2-furyl group, a 2-thienyl group, a 2-pyrimidinyl group, and a 2-benzothiazolyl group. Examples of the nonaromatic heterocyclic group include a morpholinyl group.

As the alkoxy group, a substituted or unsubstituted alkoxy group alkoxy group having 1 to 30 carbon atoms is preferable, and examples thereof include a methoxy group, an ethoxy group, an isopropoxy group, a t-butoxy group, a n-octyloxy group, and a 2-methoxyethoxy group.

As the aryloxy group, a substituted or unsubstituted aryloxy group having 6 to 30 carbon atoms is preferable, and examples thereof include a phenoxy group, a 2-methylphenoxy group, a 4-t-butylphenoxy group, a 3-nitrophenoxy group, and a 2-tetradecanoylaminophenoxy group.

As the silyloxy group, a substituted or unsubstituted silyloxy group having 0 to 20 carbon atoms is preferable, and examples thereof include a trimethylsilyloxy group and a diphenylmethylsilyloxy group.

As the heterocyclic oxy group, a substituted or unsubstituted heterocyclic oxy group having 2 to 30 carbon atoms is preferable, and examples thereof include a 1-phenyltetrazole-5-oxy group and a 2-tetrahydropyranyloxy group.

As the acyloxy group, a formyloxy group, a substituted or unsubstituted alkylcarbonyloxy group having 2 to 30 carbon atoms, or a substituted or unsubstituted arylcarbonyloxy group having 6 to 30 carbon atoms is preferable, and examples thereof include an acetyloxy group, a pivaloyloxy group, a stearoyloxy group, a benzoyloxy group, and a p-methoxyphenylcarbonyloxy group.

As the carbamoyloxy group, a substituted or unsubstituted carbamoyloxy group having 1 to 30 carbon atoms is preferable, and examples thereof include a N,N-dimethylcarbamoyloxy group, a N,N-diethylcarbamoyloxy group, a morpholinocarbonyloxy group, a N,N-di-n-octylaminocarbonyloxy group, and a N-n-octylcarbamoyloxy group.

As the alkoxycarbonyloxy group, a substituted or unsubstituted alkoxycarbonyloxy group having 2 to 30 carbon atoms is preferable, and examples thereof include a methoxycarbonyloxy group, an ethoxycarbonyloxy group, a t-butoxycarbonyloxy group, and an n-octylcarbonyloxy group.

As the aryloxycarbonyloxy group, a substituted or unsubstituted aryloxycarbonyloxy group having 7 to 30 carbon atoms is preferable, and examples thereof include a phenoxycarbonyloxy group, a p-methoxyphenoxycarbonyloxy group, and a p-n-hexadecyloxyphenoxycarbonyloxy group.

Examples of the amino group include an alkylamino group, an arylamino group, and a heterocyclic amino group. As the amino group, an amino group, a substituted or unsubstituted alkylamino group having 1 to 30 carbon atoms, a substituted or unsubstituted anilino group having 6 to 30 carbon atoms is preferable, and examples thereof include a methylamino group, a dimethylamino group, an anilino group, a N-methyl-anilino group, a diphenylamino group, and a triazinylamino group.

As the acylamino group, a formylamino group, a substituted or unsubstituted alkylcarbonylamino group having 1 to 30 carbon atoms, or a substituted or unsubstituted arylcarbonylamino group having 6 to 30 carbon atoms is preferable, and examples thereof include an acetylamino group, a pivaloylamino group, a lauroylamino group, a benzoylamino group, and a 3,4,5-tri-n-octyloxyphenylcarbonylamino group.

As the aminocarbonylamino group, a substituted or unsubstituted aminocarbonylamino group having 1 to 30 carbon atoms is preferable, and examples thereof include a carbamoylamino group, a N,N-dimethylaminocarbonylamino group, a N,N-diethylaminocarbonylamino group, and a morpholinocarbonylamino group.

As the alkoxycarbonylamino group, a substituted or unsubstituted alkoxycarbonylamino group having 2 to 30 carbon atoms is preferable, and examples thereof include a methoxycarbonylamino group, an ethoxycarbonylamino group, a t-butoxycarbonylamino group, a n-octadecyloxycarbonylamino group, and a N-methyl-methoxycarbonylamino group.

As the aryloxycarbonylamino group, a substituted or unsubstituted aryloxycarbonylamino group having 7 to 30 carbon atoms is preferable, and examples thereof include a phenoxycarbonylamino group, a p-chlorophenoxycarbonylamino group, and a m-n-octyloxyphenoxycarbonylamino group.

As the sulfamoylamino group, a substituted or unsubstituted sulfamoylamino group having 0 to 30 carbon atoms is preferable, and examples thereof include a sulfamoylamino group, a N,N-dimethylaminosulfonylamino group, and a N-n-octylaminosulfonylamino group.

As the alkyl- or aryl-sulfonylamino group, a substituted or unsubstituted alkylsulfonylamino group having 1 to 30 carbon atoms or a substituted or unsubstituted arylsulfonylamino group having 6 to 30 carbon atoms is preferable, and examples thereof include a methylsulfonylamino group, a butylsulfonylamino group, a phenylsulfonylamino group, a 2,3,5-trichlorophenylsulfonylamino group, and a p-methylphenylsulfonylamino group.

As the alkylthio group, a substituted or unsubstituted alkylthio group having 1 to 30 carbon atoms is preferable, and examples thereof include a methylthio group, an ethylthio group, and a n-hexadecylthio group.

As the arylthio group, a substituted or unsubstituted arylthio group having 6 to 30 carbon atoms is preferable, and examples thereof include a phenylthio group, a p-chlorophenylthio group, and a m-methoxyphenylthio group.

As the heterocyclic thio group, a substituted or unsubstituted heterocyclic thio group having 2 to 30 carbon atoms is preferable, and examples thereof include a 2-benzothiazolylthio group and a 1-phenyltetrazole-5-ylthio group.

As the sulfamoyl group, a substituted or unsubstituted sulfamoyl group having 0 to 30 carbon atoms is preferable, and examples thereof include a N-ethylsulfamoyl group, a N-(3-dodecyloxypropyl)sulfamoyl group, a N,N-dimethylsulfamoyl group, a N-acetylsulfamoyl group, a N-benzoylsulfamoyl group, and a N-(N'-phenylcarbamoyl)sulfamoyl group.

As the alkyl- or aryl-sulfinyl group, a substituted or unsubstituted alkylsulfinyl group having 1 to 30 carbon atoms or a substituted or unsubstituted arylsulfinyl group having 6 to 30 carbon atoms is preferable, and examples thereof include a methylsulfinyl group, an ethylsulfinyl group, a phenylsulfinyl group, and a p-methylphenylsulfinyl group.

As the alkyl- or aryl-sulfonyl group, a substituted or unsubstituted alkylsulfonyl group having 1 to 30 carbon atoms or a substituted or unsubstituted arylsulfonyl group having 6 to 30 carbon atoms is preferable, and examples thereof include a methylsulfonyl group, an ethylsulfonyl group, a phenylsulfonyl group, and a p-methylphenylsulfonyl group.

As the acyl group, a formyl group, a substituted or unsubstituted alkylcarbonyl group having 2 to 30 carbon atoms, a substituted or unsubstituted arylcarbonyl group having 7 to 30 carbon atoms, or a substituted or unsubstituted heterocyclic carbonyl group having 2 to 30 carbon atoms and being bonded to a carbonyl group through a carbon atom is preferable, and examples thereof include an acetyl group, a pivaloyl group, a 2-chloroacetyl group, a stearoyl group, a benzoyl group, a p-n-octyloxyphenylcarbonyl group, a 2-pyridylcarbonyl group, and a 2-furylcarbonyl group.

As the aryloxycarbonyl group, a substituted or unsubstituted aryloxycarbonyl group having 7 to 30 carbon atoms is preferable, and examples thereof include a phenoxycarbonyl group, an o-chlorophenoxycarbonyl group, a m-nitrophenoxycarbonyl group, and a p-t-butylphenoxycarbonyl group.

As the alkoxycarbonyl group, a substituted or unsubstituted alkoxycarbonyl group having 2 to 30 carbon atoms is preferable, and examples thereof include a methoxycarbonyl group, an ethoxycarbonyl group, a t-butoxycarbonyl group, and a n-octadecyloxycarbonyl group.

As the carbamoyl group, a substituted or unsubstituted carbamoyl group having 1 to 30 carbon atoms is preferable, and examples thereof include a carbamoyl group, a N-methylcarbamoyl group, a N,N-dimethylcarbamoyl group, a N,N-di-n-octylcarbamoyl group, and a N-(methylsulfonyl)carbamoyl group.

As the aryl- or heterocyclic azo group, a substituted or unsubstituted arylazo group having 6 to 30 carbon atoms or a substituted or unsubstituted heterocyclic azo group having 3 to 30 carbon atoms is preferable, and examples thereof include phenylazo, p-chlorophenylazo, and 5-ethylthio-1,3,4-thiadiazol-2-ylazo.

As the imido group, for example, a N-succinimido group or a N-phthalimido group is preferable.

As the phosphino group, a substituted or unsubstituted phosphino group having 0 to 30 carbon atoms is preferable, and examples thereof include a dimethylphosphino group, a diphenylphosphino group, and a methylphenoxyphosphino group.

As the phosphinyl group, a substituted or unsubstituted phosphinyl group having 0 to 30 carbon atoms is preferable, and examples thereof include a phosphinyl group, a dioctyloxyphosphinyl group, and a diethoxyphosphinyl group.

As the phosphinyloxy group, a substituted or unsubstituted phosphinyloxy group having 0 to 30 carbon atoms is preferable, and examples thereof include a diphenoxyphosphinyloxy group and a dioctyloxyphosphinyloxy group.

As the phosphinylamino group, a substituted or unsubstituted phosphinylamino group having 0 to 30 carbon atoms is preferable, and examples thereof include a dimethoxyphosphinylamino group and a dimethylaminophosphinylamino group.

As the silyl group, a substituted or unsubstituted silyl group having 0 to 30 carbon atoms is preferable, and examples thereof include a trimethylsilyl group, a t-butyldimethylsilyl group, and a phenyldimethylsilyl group.

Examples of the ionic hydrophilic group include a sulfo group, a carboxyl group, a thiocarboxyl group, a sulfino group, a phosphono group, a dihydroxyphosphino group, and a quaternary ammonium group. Among these a sulfo group or a carboxyl group is more preferable. In addition, the ionic hydrophilic group may include a cation or an anion, and a state including a cation or an anion is called a salt. In addition, the carboxyl group, the phosphono group, or the sulfo group may be in the form of a salt, and examples of a counter cation which forms a salt with the carboxyl group, the phosphono group, or the sulfo group include an ammonium ion, an alkali metal ion (for example, a lithium ion, a sodium ion, or a potassium ion), and an organic cation (for example, a tetramethylammonium ion, a tetramethylguanidium ion, or tetramethylphosphonium). Among these, a lithium salt, a sodium salt, a potassium salt, or an ammonium salt is preferable, a lithium salt, a sodium salt, or a mixed salt containing a lithium salt or a sodium salt as a major component is more preferable, and a lithium salt or a sodium salt is most preferable.

In the present invention, in a case where a compound is a salt, the salt is dissociated and present in an water-soluble ink in the form of ions.

[Coloring Composition for Dyeing]

The coloring composition for dyeing according to the present invention includes a compound represented by the following Formula (1) or a salt thereof.

<Compound Represented by Formula (1)>

The compound represented by Formula (1) will be described.

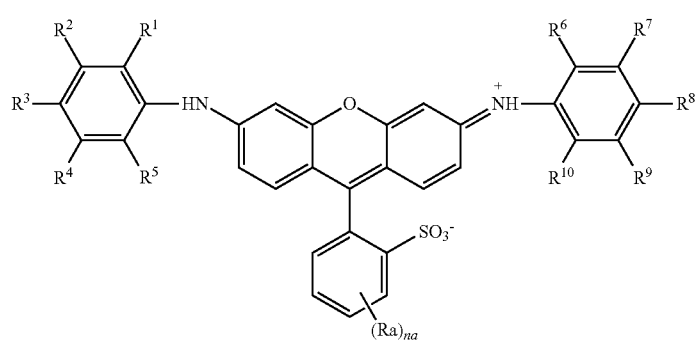

Formula (1)

In Formula (1), $R^1$, $R^5$, $R^6$, and $R^{10}$ each independently represent an unsubstituted alkyl group. $R^2$, $R^3$, $R^4$, $R^7$, $R^8$, and $R^9$ each independently represent a hydrogen atom, an unsubstituted alkyl group, or a sulfo group. The total number of carbon atoms in unsubstituted alkyl groups represented by $R^1$ to $R^5$ and the total number of carbon atoms in unsubstituted alkyl groups represented by $R^6$ to $R^{10}$ are 3 or more, and any one of $R^2$, $R^3$, $R^4$, $R^7$, $R^8$, and $R^9$ represents a sulfo group. In addition, Ra represents a monovalent substituent, and na represents 0 to 4.

By using the coloring composition for dyeing including the compound represented by Formula (1) or the salt thereof, the light fastness of dyed fabric is improved. The action mechanism for this is not clear but is presumed to be that light fastness is improved because the vicinity of a nitrogen atom is sterically protected by alkyl groups represented by $R^1$, $R^5$, $R^6$, and $R^{10}$.

By using the coloring composition for dyeing or textile printing including the compound represented by Formula (1) and the salt thereof, image bleeding is prevented. The action mechanism is not clear but is presumed to be as follows. In a case where the total number of carbon atoms in unsubstituted alkyl groups represented by $R^1$ to $R^5$ and the total number of carbon atoms in unsubstituted alkyl groups represented by $R^6$ to $R^{10}$ are 3 or more and preferably 5 or more, the improve effects are significant. Therefore, a dye is hydrophobized such that water fastness is improved and bleeding is prevented.

In Formula (1), $R^1$, $R^5$, $R^6$, and $R^{10}$ each independently represent an unsubstituted alkyl group. An alkyl group having 1 to 12 carbon atoms is preferable, an alkyl group having 1 to 6 carbon atoms is more preferable, and a methyl group, an ethyl group, or an isopropyl group is still more preferable.

It is presumed that, due to the steric effect of unsubstituted alkyl groups represented by $R^1$, $R^5$, $R^6$, and $R^{10}$, both anilino groups are effectively twisted on the xanthene moiety. As a result, it is presumed that a material which is dyed with the coloring composition for textile printing including the compound represented by Formula (1) or the salt thereof can exhibit a vivid magenta color.

In Formula (1), $R^2$, $R^3$, $R^4$, $R^7$, $R^8$, and $R^9$ each independently represent a hydrogen atom, an unsubstituted alkyl group, or a sulfo group.

In Formula (1), from the viewpoint of raw material availability and synthesis easiness, $R^2$, and $R^7$ each independently represent preferably a hydrogen atom or an unsubstituted alkyl group having 1 to 6 carbon atoms, more preferably a hydrogen atom or an unsubstituted alkyl group having 1 to 3 carbon atoms, and still more preferably a hydrogen atom.

In Formula (1), from the viewpoint of raw material availability and synthesis easiness, $R^3$ and $R^8$ each independently represent preferably an unsubstituted alkyl group or a sulfo group, more preferably an unsubstituted alkyl group having 1 to 3 carbon atoms or a sulfo group, and still more preferably a methyl group or a sulfo group.

In Formula (1), from the viewpoint of raw material availability and synthesis easiness, $R^4$ and $R^9$ each independently represent preferably a hydrogen atom, an unsubstituted alkyl group having 1 to 6 carbon atoms, or a sulfo group, more preferably a hydrogen atom, an unsubstituted alkyl group having 1 to 3 carbon atoms, or a sulfo group, and still more preferably a hydrogen atom or a sulfo group.

In Formula (1), Ra represents a monovalent substituent. In Formula (1), as the monovalent substituent represented by Ra, a substituent selected from the substituent group A can be preferably used. From the viewpoints of raw material availability and synthesis easiness, a methyl group, a chlorine atom, or a sulfo group is preferable, a chlorine atom or a sulfo group is more preferable, and a sulfo group is still more preferable.

In Formula (1), na represents 0 to 4. In Formula (1), from the viewpoints of raw material availability and synthesis easiness, na represents preferably 0, 1, or 4, more preferably 0 or 1, and still more preferably 0.

In addition, from the viewpoint of solubility in water, at least one of $R^2$, $R^3$, $R^4$, $R^7$, $R^8$, or $R^9$ in Formula (1) represents a sulfo group. Examples of a counter cation of the sulfo group include a hydrogen atom (proton), an alkali metal cation (lithium, sodium, or potassium), and ammonium. The amount of the compound represented by Formula (1) or the salt thereof dissolved in water is preferably 0.1 to 70 mass %, more preferably 0.2 to 50 mass %, and still more preferably 0.3 to 25 mass % with respect to the amount of water. The number of sulfo groups in the compound represented by Formula (1) or the salt thereof is preferably 1 to 9, more preferably 1 to 4, and still more preferably 1 to 3.

In addition, in ink jet textile printing, a step of jetting an ink including a dye to fabric from a nozzle of a recording head of an ink jet printer is provided. In this step, in consideration of an actual use, it is preferable that the ink can be jetted without any problem even when used after a long-term storage, that is, it is preferable that the ink storage stability is excellent.

From the viewpoint of ink storage stability, preferably 10 mol % or higher and more preferably 25 mol % or higher of cations included in sulfo groups represented by $R^2$, $R^3$, $R^4$, $R^7$, $R^8$, and $R^9$ in Formula (1) and cations included in an ionic hydrophilic group represented by Ra in Formula (1) are lithium ions.

In addition, preferably 10 mol % or higher and more preferably 25 mol % or higher of all the cations included in the coloring composition for dyeing according to the present invention are lithium ions.

Preferably 10 mol % or higher and more preferably 25 mol % or higher of all the cations included in the coloring composition for dyeing according to the present invention excluding cations of a cationic chromophore are lithium ions. The cationic chromophore refers to a colorant mother nucleus (chromophore) having a monovalent positive charge. Specific examples of the cationic chromophore include a cyanine colorant mother nucleus, a triarylmethane colorant mother nucleus (for example, a triarylmethane colorant mother nucleus or a xanthene colorant mother nucleus), and a diarylmethane colorant mother nucleus.

The lithium ion concentration in the coloring composition for dyeing may be adjusted by components other than the compound represented by Formula (1) or the salt thereof.

From the viewpoint of ink storage stability, the number of sulfo groups in the compound represented by Formula (1) or the salt thereof is preferably 1 to 9, more preferably 2 to 4, and still more preferably 3.

Hereinafter, specific examples of the compound represented by Formula (1) or the salt thereof will be shown, but the present invention is not limited thereto. In the following specific structural formulae of the compounds, Me represents a methyl group, Et represents an ethyl group, and i-Pr represents an isopropyl group.

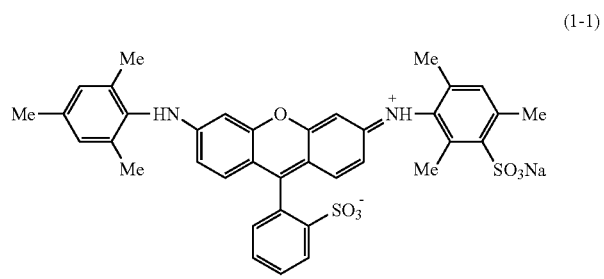
(1-1)

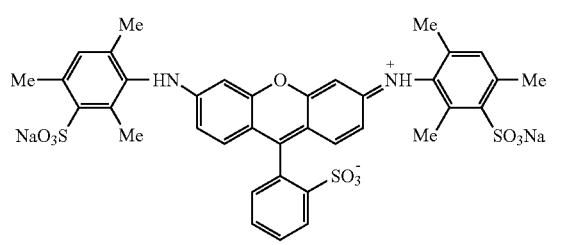
(1-2)

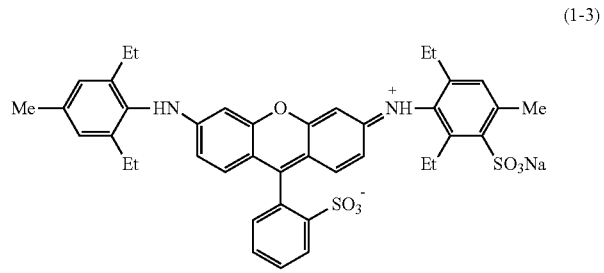
(1-3)

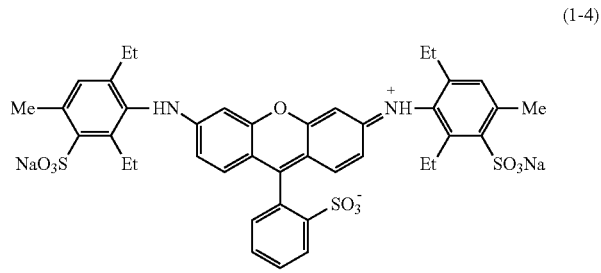
(1-4)

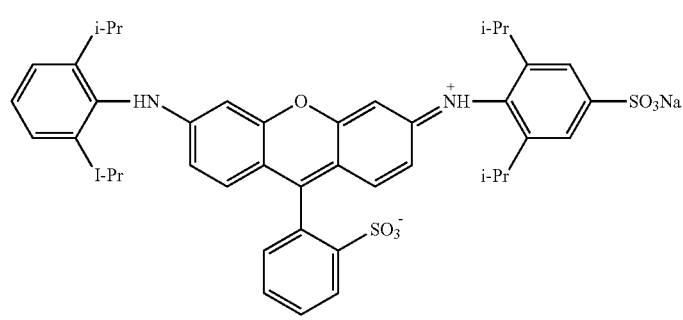
(1-5)

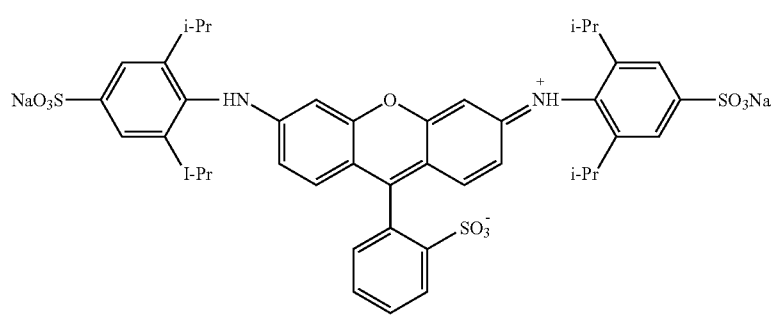
(1-6)

-continued
(1-7)
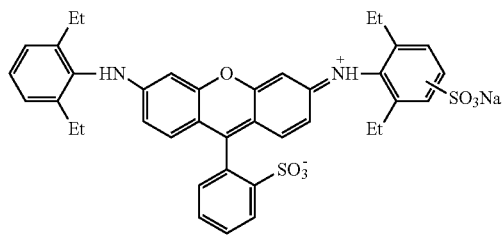
(1-8)
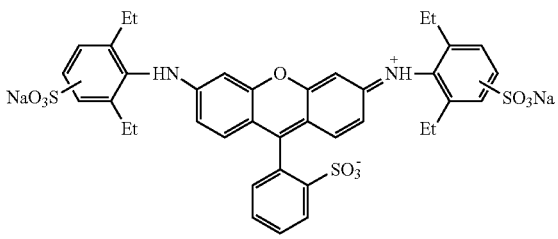
(1-9)
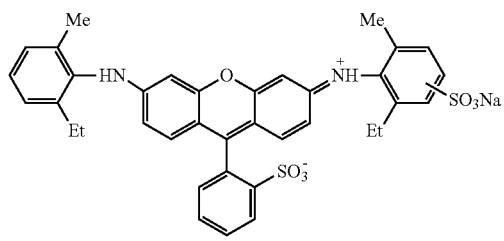
(1-10)
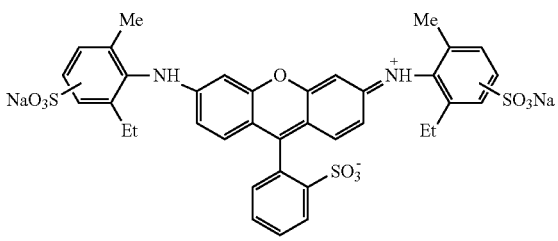
(1-11)
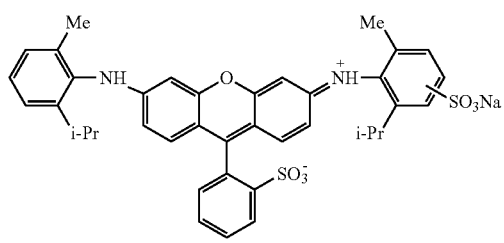
(1-12)
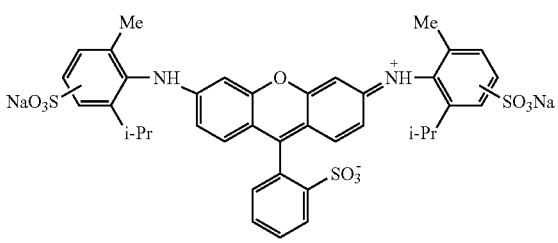
(1-13)
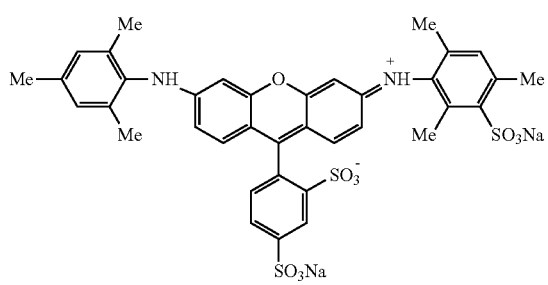
(1-14)
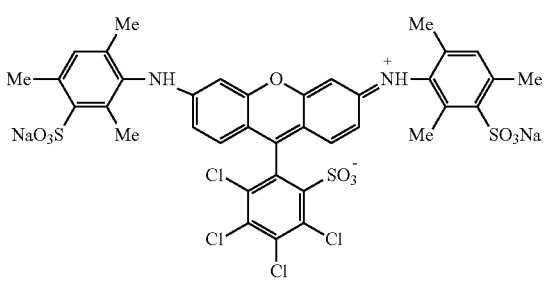
(1-1Li)
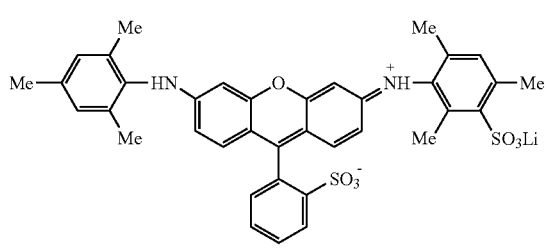
(1-2Li)
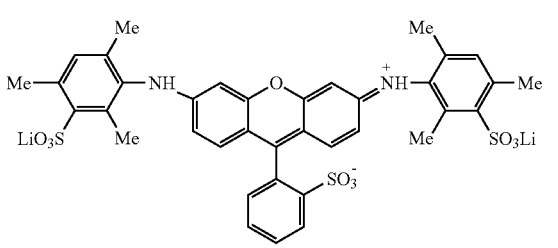
(1-3Li)
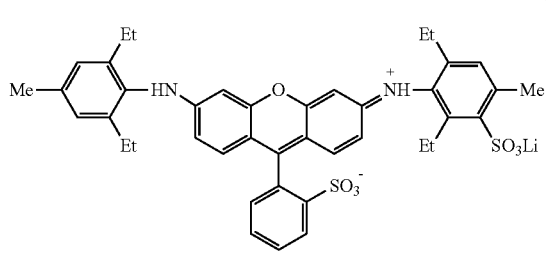
(1-4Li)
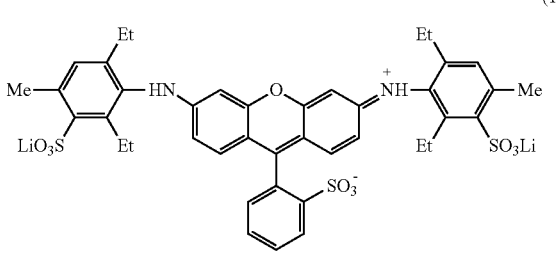

-continued
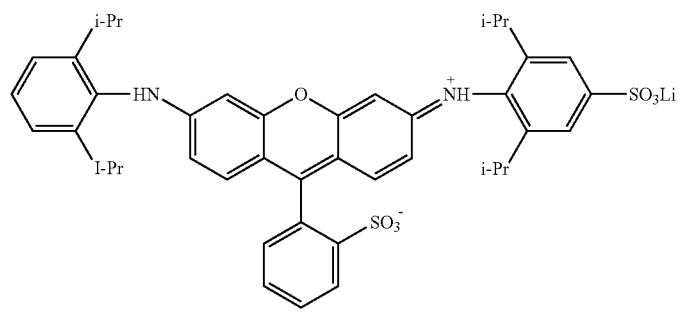
(1-5Li)
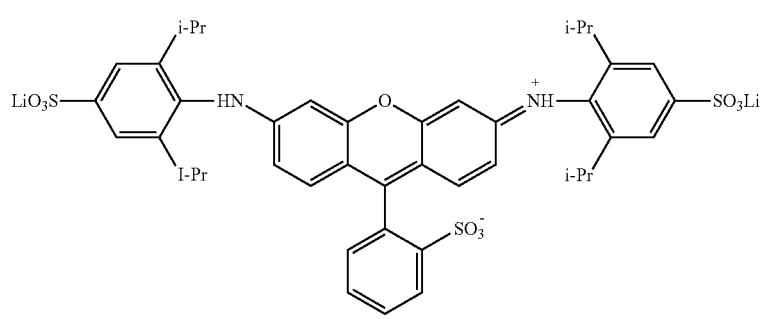
(1-6Li)
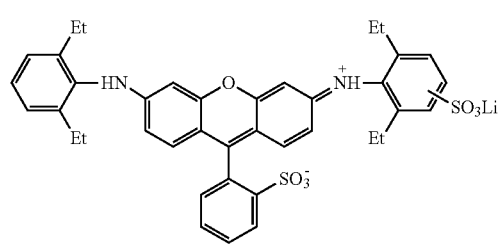
(1-7Li)
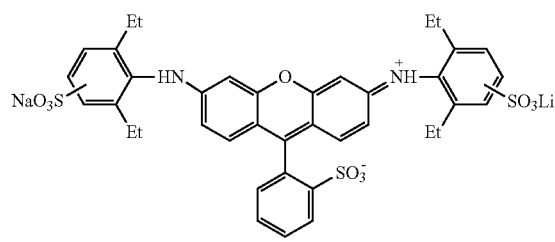
(1-8Li)
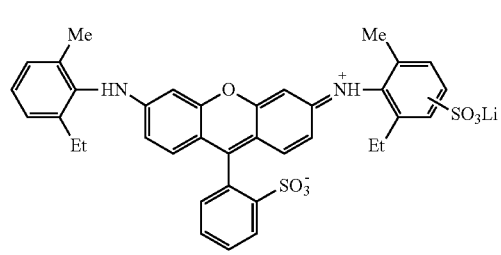
(1-9Li)
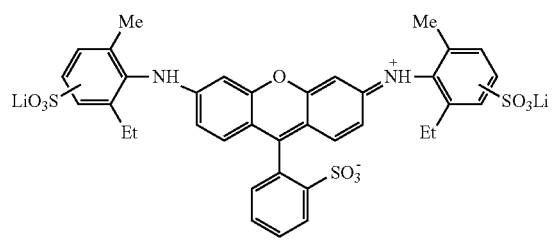
(1-10Li)
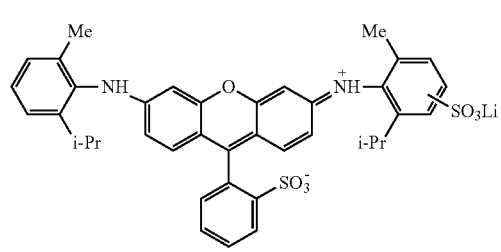
(1-11Li)
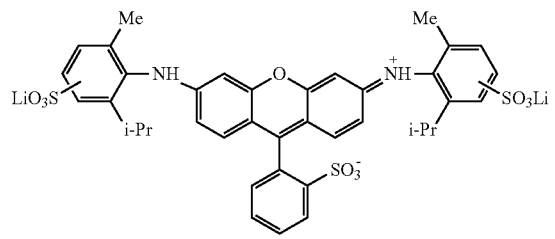
(1-12Li)

-continued (1-13Li)
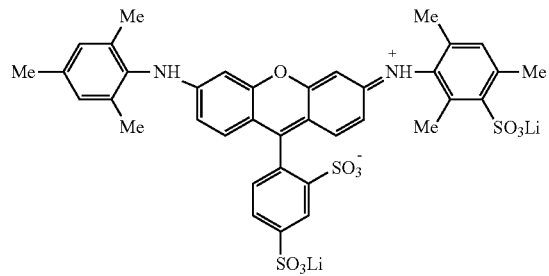

(1-14Li)
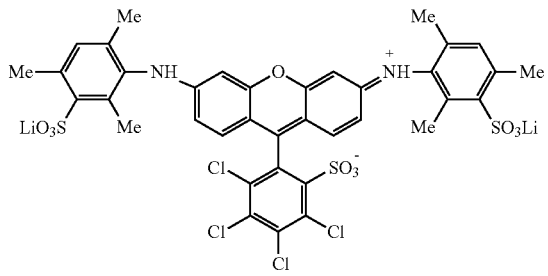

Hereinafter, specific examples of the mixed salt will be shown. In the following specific structural formulae, M represents a cation selected from the group consisting of a lithium ion, a sodium ion, a potassium ion, and an ammonium ion. n represents 1, 2, 3, 4, 5, 6, or 7, which is a cation mixing ratio of M in each of the mixed salts described in Table 1 below.

(1-1-n)
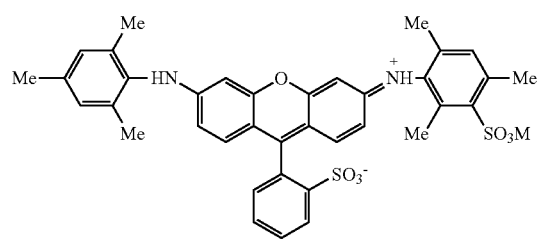

(1-2-n)
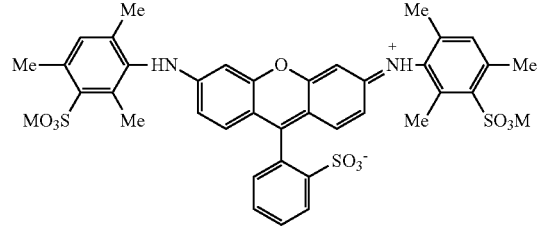

(1-3-n)
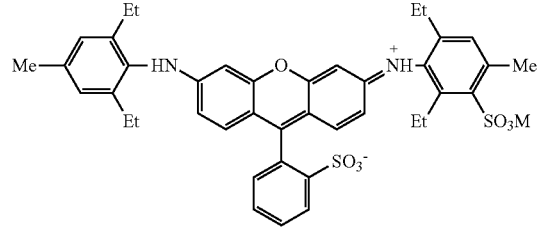

(1-4-n)
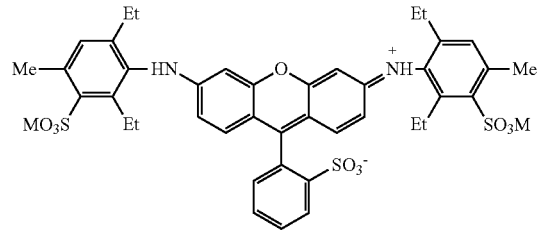

-continued (1-5-n)
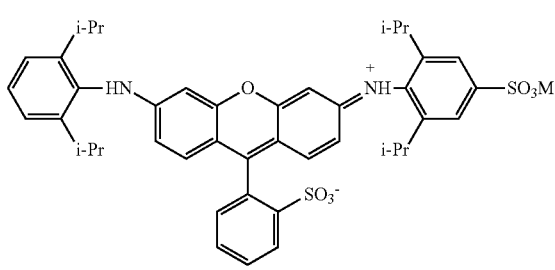

(1-6-n)
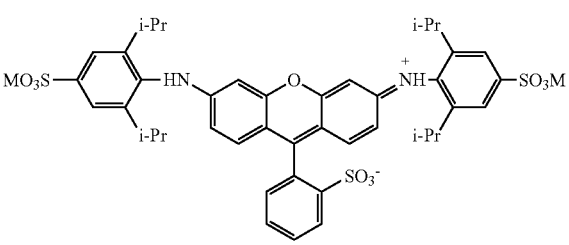

(1-7-n)
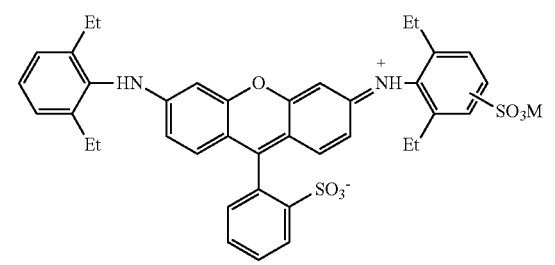

(1-8-n)
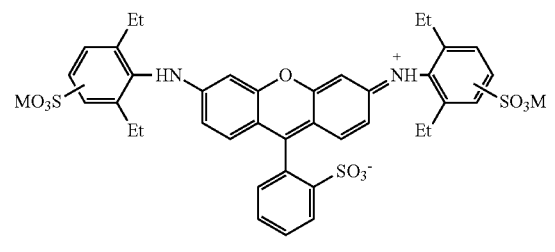

TABLE 1

| | Cation Mixing Ratio (mol %) in Mixed Salt | | | |
|---|---|---|---|---|
| | M | | | |
| n | Li$^+$ | Na$^+$ | K$^+$ | NH$_4^+$ |
| 1 | 90 | 10 | — | — |
| 2 | 90 | — | 10 | — |
| 3 | 90 | — | — | 10 |
| 4 | 75 | 25 | — | — |
| 5 | 50 | 50 | — | — |
| 6 | 25 | 75 | — | — |
| 7 | 10 | 90 | — | — |

The compound represented by Formula (1) or the salt thereof can be synthesized using a well-known method of the related art (for example, JP1997-255882A (JP-H9-255882A)). A specific synthesis method will be described in Examples.

[Coloring Composition for Textile Printing]

The coloring composition for dyeing according to the present invention is not limited in the form of use as long as it is a coloring composition for dyeing a fiber. A method of dyeing a fiber is roughly classified into a dip dyeing method and a textile printing method. Dip dyeing is a process of dipping fabric to be dyed or yarn to be dyed in a dye solution, which is obtained by dissolving or dispersing a dye in a solvent, such that the dye is uniformly adsorbed on a surface of a fiber, is diffused into the fiber, and is fixed on the fiber by bonding. Textile printing is a dyeing method of producing a dyed material having a pattern by applying a dye or a pigment to fabric to be dyed to form a pattern thereon and fixing the dye or pigment on the fabric, and an effect of forming a pattern on the fabric to be dyed using one color or multiple colors can be exhibited. Industrially, screen printing and roller printing in which a plate is used, transfer printing in which transfer paper is used, or ink jet textile printing in which a plate-making step is unnecessary is performed.

It is preferable that the coloring composition for dyeing according to the present invention is a coloring composition used for a textile printing method (coloring composition for textile printing).

In the coloring composition for dyeing according to the present invention which is also the coloring composition for textile printing (hereinafter, also referred to as "coloring composition"), one kind may be used alone, or a combination of two or more kinds may be used among compounds represented by Formula (1) or salts thereof.

The coloring composition according to the present invention as a colorant may consist of only the compound represented by Formula (1) or the salt thereof but may further include other colorants within a range where the effects of the present invention do not deteriorate. Examples of the other colorants which may be used in combination with the compound represented by Formula (1) or the salt thereof include well-known colorants, for example, dyes described in pp. 33 to 121 and pigments described in pp. 124 to 130 of "Dyeing Note" (Vol. 24, Published by Shikisensha Co., Ltd.; hereinafter, the same shall be applied).

The content of the compound represented by Formula (1) or the salt thereof in the coloring composition is preferably 1 to 20 mass % and more preferably 1 to 10 mass %.

By adjusting the content of the compound represented by Formula (1) or the salt thereof in the coloring composition to be 1 mass % or higher, the color optical density of an image on a recording medium during printing can be improved, and a required image density can be secured. In addition, by adjusting the content of the compound represented by Formula (1) or the salt thereof in the coloring composition to be 20 mass % or lower, in a case where dip dyeing or a textile printing method such as screen printing or roller printing is used, the deposition of a dye can be prevented, and the concentration thereof can be appropriately adjusted. In addition, in a case where an ink jet textile printing method is used, the jettability of the coloring composition can be improved, and, for example, an effect of preventing ink jet nozzle clogging can be obtained.

In general, the coloring composition according to the present invention includes a solvent in addition to the compound represented by Formula (1). The kind and amount of the solvent may vary depending on the kind, dyeing concentration, and dyeing method of the compound represented by Formula (1). However, the content of the solvent in the coloring composition is preferably 40 mass % or higher with respect to the total mass of the coloring composition. It is preferable that the solvent includes water, and the content of water in the solvent is preferably 50 mass % or higher with respect to the total mass of the solvent. In addition, the content of water in the coloring composition is preferably 30 mass % or higher with respect to the total mass of the coloring composition.

<Dyeing Method by Dip Dyeing (Die Dyeing Method)>

Dyeing steps of a dip dyeing method includes: a step of dipping fabric or yarn in a dye solution such that a dye is fixed on the fabric or the yarn; a washing step of washing off a portion of the dye which is not fixed on the fiber; and a drying step. In a case where the coloring composition according to the present invention is used for dip dyeing, the coloring composition can be used in the form of a dye solution in which fabric can be dipped. In this case, the dye solution may include not only a dye but also a solvent, a level dyeing agent, a pH adjuster, an inorganic neutral salt, or a dispersant. As the solvent, in general, water is used. As the additives such as a level dyeing agent, well-known additives can be used, and examples thereof include a wetting agent and a penetrant described in pp. 134 to 145 of "Dyeing Note", a metal ion binding agent described in pp. 147 to 154 of "Dyeing Note", a dispersant described in pp. 216 to 222 of "Dyeing Note", a level dyeing agent described in pp. 230 to 255 of "Dyeing Note", a resisting agent described in pp. 285 and 286 of "Dyeing Note", a migration inhibitor described in pp. 279 to 284 of "Dyeing Note", a dye fixing agent and a color fastness improving agent described in pp. 304 to 321 of "Dyeing Note", and a pH adjuster described in pp. 322 to 334 of "Dyeing Note". For uniform dyeing of a dye with high concentration, in addition to a method of using additives, a method of controlling dye concentration, dye-bath pH, salt concentration, dyeing temperature, dyeing time, pressure, and liquid current can be used.

In the washing step, water or warm water is used in a temperature range of normal temperature to 100° C. Water for washing may include a soaping agent. By completely removing a non-fixed portion of a colorant, satisfactory results can be obtained in various kinds of water fastness, for example, washing fastness or perspiration fastness.

In the drying step, specifically, washed fabric is squeezed or dehydrated and then is hung out to dry or dried using a heat roll, an iron, or the like.

<Textile Printing Method using Screen Printing, Roller Printing, or Transfer Printing>

In a case where the coloring composition according to the present invention is used for screen printing, roller printing, or transfer printing, the coloring composition for textile printing is used in the form of a color paste which is printed on fabric through a plate or transfer paper.

The textile printing method according to the present invention using screen printing, roller printing, or transfer printing includes at least the following steps (1) to (4).

(1) a step of preparing a color paste by adding the coloring composition for textile printing according to the present invention to a solution including at least a polymer compound and water;

(2) a step of printing the color paste of (1) on fabric;

(3) a step of applying steam to the printed fabric; and (4) a step of washing the printed fabric with water and drying the washed fabric.

It is preferable that the fabric includes polyamide.

The color paste is required to satisfy the following suitabilities: printing suitability for printing the color paste on a plate; and dyeing suitability for a printed material in fixing and water washing treatments.

Therefore, in order to impart the printing suitability and the dyeing suitability, the color paste may include not only a dye but also a paste, a solvent, dyeing auxiliaries, and the like.

The paste is a medium of the coloring composition, and a water-soluble polymer is used. Examples of the water-soluble polymer include a well-known water-soluble polymer such as a starch, a seaweed, a natural gum, a cellulose derivative, sodium alginate, a protein material, a tannin material, or a lignin material. In addition, a well-known synthetic polymer such as a polyvinyl alcohol compound, a polyethylene oxide compound, an acrylic acid aqueous polymer, a styrene aqueous polymer, or a maleic anhydride aqueous polymer can also be used as the paste. For example, a paste for textile printing described in pp. 349 to 361 of "Dyeing Note" can also be used. In addition, the paste can be used in combination with a printing paste improving agent described in pp. 367 to 369 of "Dyeing Note". A mixture of two or more kinds of pastes may be used. As the solvent, a water-soluble solvent is preferably used, and a solvent including at least water is most preferably used.

Examples of the dyeing auxiliaries include a color former such as an acid or an alkali, a dye solubilizer, a wetting agent, a moisture absorbent, a deep dyeing agent, an antireducing agent, a metal ion binding agent, a ultraviolet absorber, a dispersant, a resisting agent, a discharge agent, a preservative, an fungicide, an antioxidant, a migration inhibitor, a dye fixing agent, and an anti-foaming agent.

As the dyeing auxiliaries, well-known dyeing auxiliaries can be used, and examples thereof include a solubilizer and a solubilizing agent described in pp. 336 to 338 of "Dyeing Note", a deep dyeing agent, a level dyeing agent, and a penetrant described in pp. 339 to 345 of "Dyeing Note", an anti-foaming agent described in pp. 346 to 348 of "Dyeing Note", a metal ion binding agent described in pp. 147 to 154 of "Dyeing Note", a dispersant described in pp. 216 to 222 of "Dyeing Note", a resisting agent described in pp. 370 to 374 of "Dyeing Note", a discharge agent described in pp. 375 to 381 of "Dyeing Note", a preservative and an fungicide described in pp. 362 to 363 of "Dyeing Note", a migration inhibitor described in pp. 279 to 284 of "Dyeing Note", a dye fixing agent described in pp. 426 to 429 of "Dyeing Note", a wet fastness improving agent described in JP1994-166969A (JP-H06-166969A), and a light fastness improving agent described in U.S. Pat. No. 5,336,443A.

The steps (1) to (4) will be described in more detail.

In the step (1) of preparing a color paste, dyeing auxiliaries are added to a paste solution obtained by dissolving or dispersing a paste in a solvent, a dye solution obtained by dissolving or dispersing a dye in a solvent is added to the paste solution, and the components are stirred. As a result, a color paste is prepared.

In the textile printing method, unlike the dip dyeing method, after the step (2) of printing the color paste on fabric, a treatment of fixing the colorant, which is printed on the fabric, on the fiber is performed in the step (3) of applying steam to the printed fabric. This treatment is called a color developing step, and a method using heated air or a method using normal pressure saturated steam or superheated steam can be performed for the treatment. In particular, a method using normal pressure saturated steam is preferable. In the step of applying steam to the printed fabric, the temperature and time in the steam treatment vary depending on the kind of the coloring composition and the kind of the fabric. For example, the temperature is preferably 100° C. to 108° C., and the time is preferably 1 to 60 minutes and more preferably 1 to 30 minutes. After the step of applying steam to the printed fabric, as in the case of a dip dyeing method, a washing step and a drying step (4) are performed to obtain a printed material.

<Textile Printing Method using Coloring Composition for Ink Jet Textile Printing>

In a case where the coloring composition according to the present invention is used for ink jet textile printing, the ink for ink jet textile printing including the coloring composition for textile printing according to the present invention is used. An ink jet textile printing method has advantageous effects in that, compared to a textile printing method of the related art, an image having excellent tone characteristics can be rapidly formed. Therefore, there are merits in that, for example, the delivery time can be reduced, many kinds in small quantities can be produced, and a plate-making step is unnecessary. Further, in ink jet textile printing, only an amount of ink required for forming an image is used. Therefore, it can be said that ink jet textile printing is an image forming method having excellent environmental friendliness in that, for example, the amount of waste liquid is less than that in a method of the related art.

The ink for ink jet textile printing causes nozzle clogging of an ink jet head in a case where the viscosity thereof increases due to evaporation of water, an aqueous organic solvent, or the like from a nozzle tip or a case where a dye as a solid component is deposited. Therefore, it is required that the ink for ink jet textile printing has more satisfactory color developing properties than that used in textile printing of the related art. In addition, it is required that ink suitability such as ink storage stability or jetting stability, dyeing suitability such as bleeding prevention or contamination prevention, and image fastness such as light fastness, water fastness, or washing fastness are also imparted to the ink for ink jet textile printing.

An ink jet textile printing method according to the present invention includes at least the following steps (11) to (14):

(11) a step of applying a paste including at least a polymer compound and water to fabric;

(12) a step of printing the ink for ink jet textile printing according to the present invention on the fabric using an ink jet method;

(13) a step of applying steam to the printed fabric; and

(14) a step of washing the printed fabric with water and drying the washed fabric.

It is preferable that the fabric includes polyamide.

In a case where a color paste used in a textile printing method of the related art is used in the ink jet textile printing method, nozzle clogging occurs. Therefore, in the ink jet textile printing method, a pre-treatment step of applying a paste to fabric in advance (the step of applying a paste including at least a polymer compound and water to fabric) is necessary. By performing the pre-treatment step, fabric handleability is improved. Specifically, pre-treated fabric is obtained by applying a paste solution including a paste, a solvent, and a hydrotropy agent to fabric and drying the fabric.

As the paste, the same paste as that used for screen printing or the like can be used.

As the solvent, a water-soluble solvent is preferably used, and a solvent including at least water is most preferably used.

In general, the hydrotropy agent serves to increase the color optical density of an image when fabric to which an ink composition is applied is heated by steam. For example, typically, urea, alkyl urea, ethylene urea, propylene urea, thiourea, guanidine hydrochloride, or tetraalkyl ammonium halide is used. In addition, a well-known hydrotropy agent can be used, and examples thereof include a dye fixing agent described in pp. 426 to 429 of "Dyeing Note". The content of the hydrotropy agent is preferably 0.01 mass % to 20 mass % with respect to the total solid content of the paste solution.

Optionally, the paste solution further includes, for example, a pH adjuster, an aqueous (water-soluble) metal salt, a water repellant, a surfactant, a migration inhibitor, or a micropore forming agent. As these additives, well-known additives can be used, and examples thereof include a solubilizer and a solubilizing agent described in pp. 336 to 338 of "Dyeing Note", a deep dyeing agent, a level dyeing agent, and a penetrant described in pp. 339 to 345 of "Dyeing Note", a metal ion binding agent described in pp. 147 to 154 of "Dyeing Note", a resisting agent described in pp. 370 to 374 of "Dyeing Note", a discharge agent described in pp. 375 to 381 of "Dyeing Note", a preservative and an fungicide described in pp. 362 to 363 of "Dyeing Note", a migration inhibitor described in pp. 279 to 284 of "Dyeing Note", a micropore forming agent described in JP1995-316991A (JP-H07-316991A), a wet fastness improving agent described in JP1994-166969A (JP-H06-166969A), and a light fastness improving agent described in U.S. Pat. No. 5,336,443A. In addition, an additive described in paragraphs "0096" to "0101" of JP2013-209786A can also be used.

The steps (11) to (14) will be described in more detail.

In the step (pre-treatment) (1) of applying a paste to fabric, the pre-treatment, the paste solution is padded at a squeezing rate of 5% to 150% and preferably 10% to 130%.

In the pre-treatment, a method of applying the respective paste solutions to fabric is not particularly limited, and examples thereof include methods which are typically performed, for example, a padding method, a coating method, a screening method, a spraying method, a transfer method, and an ink jet method.

Next, (2) the pre-treated fabric is printed using the color paste including the ink for ink jet textile printing.

The ink for ink jet textile printing can be prepared by dissolving and/or dispersing the compound (mixture) represented by Formula (1) or the salt thereof in a solvent.

The solvent is determined based on, for example, the kind of the substituent used in Formula (1), the kind of the solvent component used for producing the coloring composition, and the kind of fabric to be dyed. It is preferable that water or a water-soluble organic solvent is used.

Examples of the water-soluble organic solvent which may be included in the ink composition according to the present invention include a polyhydric alcohol such as diethylene glycol or glycerin, an amine, a monohydric alcohol, and a polyhydric alcohol alkyl ether. In addition, each compound which is described as an example of a water-miscible organic solvent in paragraph "0076" of JP2002-371079A is preferable.

The content of the water-soluble organic solvent in the ink for ink jet textile printing according to the present invention is preferably 10 mass % to 60 mass % with respect to the total mass of the ink for ink jet textile printing.

In addition, in a case where the water-soluble organic solvent is used as the solvent in the ink for ink jet textile printing according to the present invention, the content of water is preferably 35 mass % to 90 mass % with respect to the total mass of the solvent.

As the surfactant, any one of a cationic surfactant, an anionic surfactant, an amphoteric surfactant, and a nonionic surfactant can be used. Examples of the cationic surfactant include an aliphatic amine salt and an aliphatic quaternary ammonium salt. Examples of the anionic surfactant include a fatty acid soap and a N-acyl-N-methylglycine salt. Examples of the amphoteric surfactant include carboxy betaine, sulfo betaine, aminocarboxylate, and imidazolinium betaine. Examples of the nonionic surfactant include polyoxyethylene alkyl ether, acetylenic glycol, and acetylene alcohol. A surfactant which is described as an example of a surface tension adjuster in paragraph "0073" of JP2002-371079A, or a surfactant which is described in JP2008-266466A or JP1999-2693929A (JP-H11-2693929A) is preferably used.

In addition, the ink for ink jet textile printing according to the present invention optionally includes other additives within a range where the effects of the present invention do not deteriorate. Examples of the other additives include well-known additives such as an anti-drying agent (wetting agent), an antifading agent, an emulsion stabilizer, a penetration enhancer, a ultraviolet absorber, an infrared absorber, a preservative, a fungicide, a pH adjuster, a surface tension adjuster, an anti-foaming agent, a viscosity adjuster, a dispersant, a dispersion stabilizer, a rust inhibitor, a chelating agent, an anti-reducing agent, an antioxidant, an antistatic agent, and a fluorescence brightening agent. In the case of a water-soluble ink, these various additives are directly added to the ink solution. In a case where an oil-soluble dye is used in the form of a dispersion, in general, the additives are added to a dye dispersion after the preparation of the dispersion. However, the additives may be added in the form of an oil phase or a water phase during the preparation. In a case where an oil-soluble dye is used in the form of a dispersion, a dispersant can be used. As the dispersant, for example, a dispersant described in pp. 216 to 222 of "Dyeing Note" can be used.

As the anti-drying agent, the antifading agent, the ultraviolet absorber, the fungicide, the pH adjuster, the surface tension adjuster, the anti-foaming agent, and the chelating agent, those described in paragraphs "0224" to "0231" of JP2014-5462A can be used. In addition, the ink for ink jet textile printing according to the present invention may also include a wet fastness improving agent described in JP1994-166969A (JP-H06-166969A) and a light fastness improving agent described in U.S. Pat. No. 5,336,443A.

The penetration enhancer is used in order to enhance the penetration of the ink for ink jet textile printing into the fiber and the fixing of the ink thereon. As the penetration enhancer, a well-known additive can be used. For example, a wetting agent, a penetrant, a level dyeing agent, a retarding agent, and an alcohol such as ethanol, isopropanol, butanol, di(tri)ethylene glycol monobutyl ether, or 1,2-hexanediol described in pp. 223 to 255 of "Dyeing Note"; sodium lauryl sulfate, sodium oleate, a nonionic surfactant; or a branched polyhydric alcohol described in WO10/109867A or JP1994-57644A (JP-H06-57644A) can be used. Typically, these penetration enhancers function in a case where the addition amount in the ink is 5 to 35 mass %. It is preferable that the penetration enhancer is used in an addition amount range where bleeding does not occur after dyeing and where ink leakage from a back surface does not occur.

In a case where the compound (mixture) represented by Formula (1) or the salt thereof according to the present invention is dispersed in an aqueous medium to prepare the ink for ink jet textile printing, a method described in paragraphs "0232" to "0233" of JP2014-5462A can be used for dispersing.

In the present invention, the content of the compound represented by Formula (1) in the ink for ink jet textile printing is determined based on, for example, the kind of the substituent used in Formula (1), and the kind of the solvent component used for manufacturing the ink for ink jet textile printing. The content of the compound represented by Formula (1) in the ink for ink jet textile printing is preferably 1 to 20 mass % and more preferably 1 to 10 mass % with respect to the total mass of the ink for ink jet textile printing.

The viscosity of the ink for ink jet textile printing according to the present invention is preferably 30 mPa·s or lower. In addition, the surface tension of the ink for ink jet textile printing according to the present invention is preferably 25 mN/m to 70 mN/m. The viscosity and the surface tension can be adjusted by adding various additives such as a viscosity adjuster, a surface tension adjuster, a specific resistance adjuster, a film conditioner, a ultraviolet absorber, an antioxidant, an antifading agent, a fungicide, a rust inhibitor, a dispersant, and a surfactant.

The ink for ink jet textile printing according to the present invention can be used not only for forming a monochromic image but also forming a full color image. In order to form a full color image, a magenta ink, a cyan ink, and a yellow ink can be used. In addition, in order to adjust the color, a black ink may be further used. As the dye, a dye described in paragraphs "0237" to "0240" of JP2014-5462A can be used.

The ink for ink jet textile printing according to the present invention can be used as any one of various color inks but is preferably used as a magenta ink.

After drying, fabric which is printed using an ink jet method undergoes the step (color developing step) (13) of applying steam to the printed fabric and the step (14) of washing the printed fabric and drying the washed fabric to obtain a printed material as in the case of other textile printing methods. A preferable method for performing the color developing step to the drying step is the same as in screen printing or the like.

The fabric used in the present invention is optionally pre-treated. The treatment may be performed before or after applying the paste to the fabric in the ink jet textile printing method. In addition, a pre-treatment agent may be added to the paste solution which applied before dyeing. Specific examples of a pre-treatment method include methods described in JP2002-339268A, JP2000-54277A, JP1995-150482A (JP-H07-150482A), JP2008-174865A, JP2012-154006A, JP2012-12730A, JP1990-68372A (JP-H02-68372A), JP1988-31594B (JP-563-31594B), JP2002-275769A, JP2001-81680A, JP2004-68208A, JP1999-43873A (JP-H11-43873A), JP2007-217829A, JP2006-83495A, JP2005-154936A, JP2002-105875A, JP2002-348786A, JP1999-81163A (JP-H11-81163A), JP1990-61183A (JP-H02-61183A), JP2001-295186A, JP2004-60073A, JP2003-113583A, JP1996-100379A (JP-H08-100379A), JP1990-53976A (JP-H02-53976A), JP2000-226781A, JP2004-292989A, JP2002-249991A, JP2002-363872A, JP1994-341070A (JP-H06-341070A), JP2004-197237A, JP2008-223192A, and JP2011-179130A.

On the fabric used in the present invention, optionally, a flame-retardant treatment described JP1987-257464A (JP-562-257464A), a plasma treatment JP1990-47378A (JP-H02-47378A), or a treatment for improving fastness such as light fastness, wet fastness, or chlorine fastness described in JP1985-94678A (JP-560-94678A), JP2002-266236A, JP2007-321247A, JP1991-287873A (JP-H03-287873A), or JP2004-131919A is performed. These treatments may be performed before or after dyeing.

A method for ink jet textile printing in which the ink according to the present invention is used is not particularly limited as long as it includes a step of jetting the ink on fabric using an ink jet device. For example, methods for ink jet textile printing described in JP1997-296379A (JP-H09-296379A), JP1999-43873A (JP-H11-43873A), JP1995-70953A (JP-H07-70953A), JP1995-197384A (JP-H07-197384A), JP1995-70950A (JP-H07-70950A), JP1991-104977A (JP-H03-104977A), JP2007-303046A, JP2007-313717A, and JP2008-248437A are known.

In addition, as a device for ink jet textile printing, an arbitrary ink jet device can be used. For example, methods described in JP1991-45774A (JP-H03-45774A), JP2001-277656A, JP2000-290882A, JP2001-18390A, JP2010-83040A, and JP2011-31418A are known.

[Fabric]

The present invention also relates to fabric which is dyed using the coloring composition for dyeing or the coloring composition for textile printing.

The present invention also relates to a fabric which is printed using the textile printing method according to the present invention.

It is preferable that the compound represented by Formula (1) or the salt thereof is used as a dye to dye or print fabric.

By changing the kind of the substituent of the compound represented by Formula (1) or the salt thereof, various kinds of dyes can be prepared.

The compound represented by Formula (1) or the salt thereof includes at least one sulfo group. Therefore, in a case where the compound represented by Formula (1) or the salt thereof is used as an acid dye, fabric made of a protein fiber such as silk or wool or a polyamide fiber such as 6 nylon or 66 nylon can be suitably dyed.

In addition, In a case where the compound represented by Formula (1) is an oil-soluble compound, which is insoluble in water, and is used as a dispersed dye, a hydrophobic fiber such as polyester can be generally dyed but an acrylic fiber or a polyamide fiber can also be dyed.

As the fabric, fabric made of one fiber may be used, or a composite fiber made of two or more fibers may be used.

It is preferable that the compound represented by Formula (1) is an acid dye. In particular, when a polyamide fiber is dyed with this acid dye, excellent fixing properties can be obtained, and various performances of dyed fabric such as light fastness or wet fastness can be improved.

As fabric to be dyed, fabric including polyamide is preferable. Fabric made of only polyamide may be used, fabric made of a composite fiber may be used. Examples of the composite fiber include fibers described in JP2008-202210A, JP2006-322131A, and JP2007-100270A. Among these polyamide fibers, fabric made of a fibers including 6 nylon or 66 nylon is preferable.

As a material to be dyed, fabric is preferable. However, even in a case where yarn is dyed, the same effects can be obtained.

[Compound]

The present invention relates to a compound represented by any one of Formulae (1-1) to (1-6) and (1-1Li) to (1-6Li).

The compound represented by any one of Formulae (1-1) to (1-6) and (1-1Li) to (1-6Li) is particularly preferable as a compound included in the coloring composition for dyeing according to the present invention.

EXAMPLES

Hereinafter, the present invention will be described using examples, but the present invention is not limited to these examples. Unless specified otherwise, "%" and "part(s)" represent "mass %" and "part(s) by mass".

Synthesis Examples

[Synthesis of Exemplary Compound (1-1)]

Exemplary Compound (1-1) can be synthesized, for example, using the following scheme.

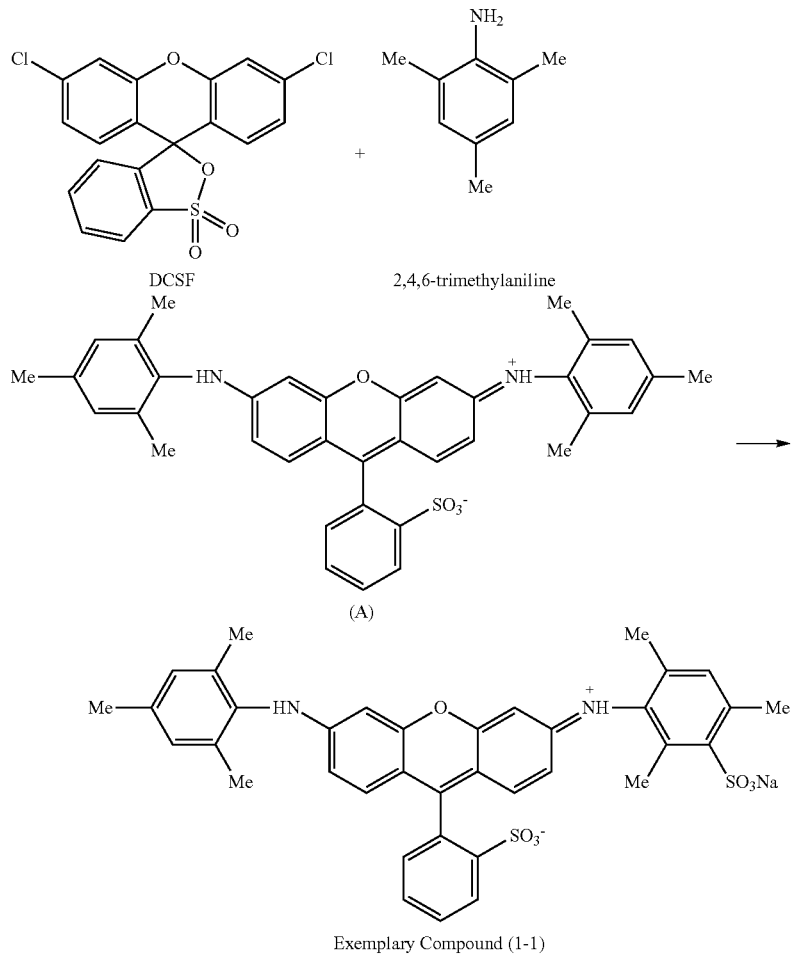

(Synthesis of Intermediate Product (A))

74.1 g of dichloro sulfophthalein (DCSF) (content: 70%; DCSF (trade name), manufactured by Chugai kasei Co., Ltd.), 80.0 g of 2,4,6-trimethylaniline (manufactured by Tokyo Chemical Industry Co., Ltd.), and 28.6 g of zinc chloride were caused to react with each other in 320 g of sulfolane at 200° C. for 3 hours. The reaction solution was allowed to cool to 25° C. and was poured into 2 L of dilute hydrochloric acid to precipitate crystals. The precipitated crystals were separated by filtering and were washed with 1 L of dilute hydrochloric acid and 1 L of water. The obtained wet cake was dispersed in 1 L of acetonitrile and was stirred under heating at 45° C. for 30 minutes. The crystals were separated, were washed with a small amount of acetonitrile, and were dried using a fan dryer at 60° C. As a result, a coarse body of red violet crystals as Intermediate Product (A) was obtained.

Yield amount: 80 g

MS (m/z)=602.2 (M+, 100%), 603.2 ([M+1]+1)

(Synthesis of Exemplary Compound (1-1))

18 g of Intermediate Product (A) was divided added to and dissolved in 180 g of concentrated sulfuric acid (95%, manufactured by Wako Pure Chemical Industries, Ltd.) at 20° C. to 30° C. while stirring them. The solution was cooled such that the internal temperature was 5° C., and 50 mL of fuming sulfuric acid (25%, manufactured by Wako Pure Chemical Industries, Ltd.) was added dropwise thereto while maintaining the internal temperature at 0° C. to 8° C. After the dropwise addition, the components were caused to react with each other at an internal temperature of 5° C. for 2 hours. The reaction solution was poured into 10% saline solution at an internal temperature of 30° C. or lower, and a precipitated solid was separated. The obtained solid was dissolved in 200 g of water, and the pH thereof was adjusted to 7.0 using dilute sodium hydroxide. Next, the obtained solution was purified by column chromatography (filler: SEPHADEX LH-20 (manufactured by Pharmacia), developing solvent: water/methanol). Next, an inorganic salt and a residual organic solvent were removed using a dialysis membrane (molecular weight cutoff: 3500, Spectra/Por 3 Dialysis Membrane (trade name, manufactured by Spectrum, Inc.)). The pH of the obtained aqueous solution was adjusted to 7 again using a dilute sodium hydroxide aqueous solution, and dust was removed by filtering using a membrane filter. The obtained aqueous solution was condensed and dried using a rotary evaporator. As a result, crystals of Exemplary Compound (1-1) were obtained.

Yield amount: 6.6 g
Yield ratio: 31%
MS (m/z)=784 ([M-Na]$^-$, 100%)

FIG. 1 shows an absorption spectrum in a dilute aqueous solution of Exemplary Compound (1-1). As shown in FIG. 1, in Exemplary Compound (1-1), the absorption maximum was 529 nm, and the molar absorption coefficient was 89600.

[Synthesis of Exemplary Compound (1-2)]

Exemplary Compound (1-2) was obtained using the same synthesis method as that of Exemplary Compound (1-1), except that: the amount of fuming sulfuric acid was changed to 65 mL; and the reaction time was changed to 48 hours.

MS (m/z)=681 ([M-Na]$^-$, 100%)

In an absorption spectrum of Exemplary Compound (1-2) in the dilute aqueous solution, the absorption maximum was 528 nm, and the molar absorption coefficient was 104000.

[Synthesis of Exemplary Compound (1-3)]

Exemplary Compound (1-3) was obtained using the same synthesis method as that of Exemplary Compound (1-1), except that 2,6-diethyl-4-methylaniline was used instead of 2,4,6-trimethylaniline in the synthesis method of Intermediate Product (A).

MS (m/z)=738 ([M-Na]$^-$, 100%)

In an absorption spectrum of Exemplary Compound (1-3) in the dilute aqueous solution, the absorption maximum was 531 nm, and the molar absorption coefficient was 88100.

(Synthesis of Exemplary Compound (1-1Li))

Exemplary Compound (1-1) was dissolved in water to prepare 2 mass % of an aqueous solution. This aqueous solution was caused to pass through a column filled with a cation exchange resin (lithium form). The obtained aqueous solution was condensed and dried using a rotary evaporator. As a result, crystals of Exemplary Compound (1-1Li) were obtained.

MS (m/z)=784 ([M-Li]$^-$, 100%)

In Exemplary Compound (1-1Li), the absorption maximum was 529 nm, and the molar absorption coefficient was 89200. When cations were analyzed with an ion chromatograph, the lithium salt content was 100%.

[Synthesis of Exemplary Compound (1-2Li)]

Exemplary Compound (1-2Li) was obtained using the same synthesis method as that of Exemplary Compound (1-1Li), except that: the amount of fuming sulfuric acid was changed to 65 mL; and the reaction time was changed to 48 hours.

MS (m/z)=681 ([M-Li]$^-$, 100%)

In an absorption spectrum of Exemplary Compound (1-2Li) in the dilute aqueous solution, the absorption maximum was 528 nm, and the molar absorption coefficient was 104200. When cations were analyzed with an ion chromatograph, the lithium salt content was 100%.

[Synthesis of Exemplary Compound (1-3Li)]

Exemplary Compound (1-3) as a desired Na form and Exemplary Compound (1-3Li) were obtained using the same synthesis method as that of Exemplary Compound (1-1Li), except that 2,6-diethyl-4-methylaniline was used instead of 2,4,6-trimethylaniline in the synthesis method of Intermediate Product (A).

MS (m/z)=738 ([M-Li]$^-$, 100%)

In an absorption spectrum of Exemplary Compound (1-3Li) in the dilute aqueous solution, the absorption maximum was 531 nm, and the molar absorption coefficient was 88000. When cations were analyzed with an ion chromatograph, the lithium salt content was 100%.

In addition, other exemplary compounds can also be synthesized using the same synthesis method, and a cation exchange resin having a desired cation form can also be used.

A mixed salt can be obtained by mixing respective salts at a desired molar ratio. For example, Exemplary Compound (1-1-1) can be obtained by mixing 90 mol % of Exemplary Compound (1-1Li) and 10 mol % of Exemplary Compound (1-1) with each other.

A counter cation ratio in a dye can be verified by analyzing an aqueous dye solution using an ion chromatograph (for example, HIC-NS non-suppressor ion chromatograph, manufactured by Shimadzu Corporation).

[Dip Dyeing Evaluation]

Nylon 6 jersey (manufactured by Shikisensha Co., Ltd.; fabric described below was manufactured by Shikisensha Co., Ltd.) as fabric was dipped in 150 g of a dye bath including 1.5 g of a dye, 7.5 g of ammonium sulfate, and water as shown in Table 2, was heated to 98° C. for 40 minutes, and was dyed at the same temperature for 30 minutes. After dyeing, the nylon 6 jersey was slowly cooled to 60° C. and was washed with water. After dyeing, the evaluation results are shown in Table 2.

Comparative Compound A

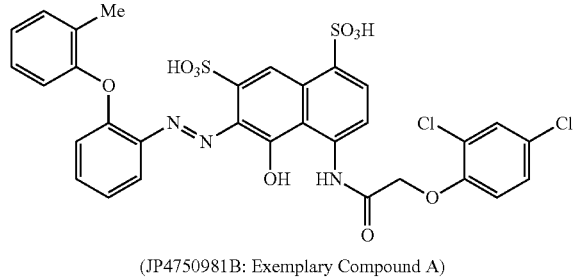

(JP4750981B: Exemplary Compound A)

Comparative Compound B

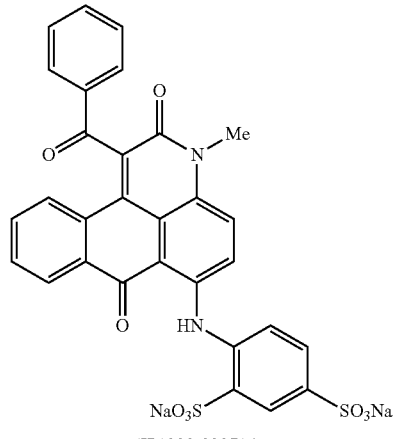

(JP1999-029714A)
(JP-H11-029714A): Exemplary Compound 012)

-continued

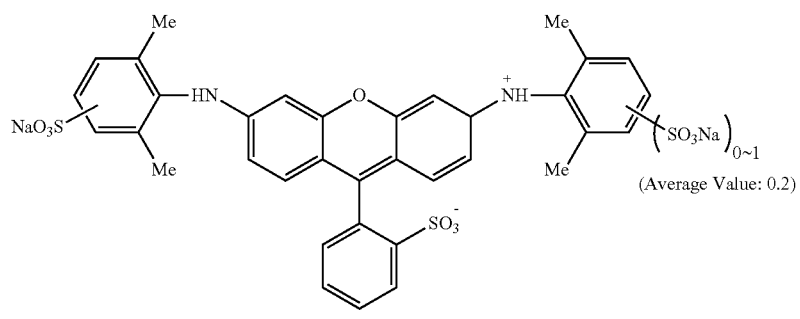

(JP2002-348502A: Acid Red 289)

Comparative Compound C

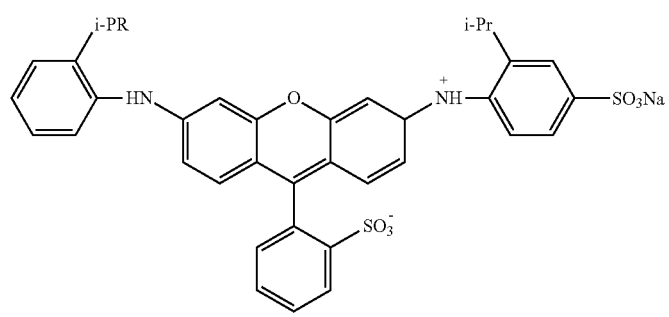

(JP1997-255882A (JP-H9-255882A)): Exemplary Compound 5)

Comparative Compound D

[Evaluation Method]
1. Color

The color of the dyed fabric was observed by visual inspection.

2. Evaluation of Color Optical Density (OD Value)

Using a spectrodensitometer ("X-rite 938", manufactured by X-rite Inc.), the CMYK density of the dyed fabric was measured under conditions of a density filter (ISO status A), density white base (absolute white base), no polarization filter, and a view angle of 2° such that the reflection density of magenta (M) was measured as OD-Magenta.

3. Light Fastness Evaluation

Using Xenon Fade-OMeter, dyed samples prepared according to ISO 105-B02 were irradiated with xenon light for 6 hours. Before and after the irradiation of the xenon light, the lightness value L* and the chroma values a* and b* of each of the samples in the CIE L*a*b* color space (International Commission on illumination (1976)/JIS Z8781-4:2013) were measured using spectrodensitometer ("X-rite 938", manufactured by X-rite Inc.), and ΔEab as a color difference between two samples was obtained based on ΔL*, Δa*, and Δb* which were differences between coordinate values L*, a*, and b* in the L*a*b* color space. A lower value represents that the behavior before and after the light irradiation is small and excellent.

$$\Delta Eab = (\Delta L^{*2} + \Delta a^{*2} + \Delta b^{*2})^{0.5}$$

TABLE 2

| | Dye | Color | OD | Light Fastness ΔEab |
|---|---|---|---|---|
| Example 1 | Exemplary Compound (1-1) | Magenta | 1.5 | 6 |
| Example 2 | Exemplary Compound (1-2) | Magenta | 1.4 | 6 |
| Example 3 | Exemplary Compound (1-3) | Magenta | 1.5 | 5 |

TABLE 2-continued

| | Dye | Color | OD | Light Fastness ΔEab |
|---|---|---|---|---|
| Example 4 | Exemplary Compound (1-4) | Magenta | 1.4 | 5 |
| Example 5 | Exemplary Compound (1-5) | Magenta | 1.4 | 5 |
| Example 6 | Exemplary Compound (1-6) | Magenta | 1.4 | 4 |
| Example 7 | Exemplary Compound (1-7) | Magenta | 1.4 | 8 |
| Example 8 | Exemplary Compound (1-9) | Magenta | 1.4 | 8 |
| Example 9 | Exemplary Compound (1-11) | Magenta | 1.4 | 7 |
| Example 10 | Exemplary Compound (1-13) | Magenta | 1.4 | 8 |
| Comparative Example 1 | Comparative Compound A | Reddish Magenta | 1.3 | 7 |
| Comparative Example 2 | Comparative Compound B | Dull Magenta | 1.0 | 7 |
| Comparative Example 3 | Comparative Compound C | Magenta | 1.1 | 14 |
| Comparative Example 4 | Comparative Compound D | Magenta | 1.1 | 16 |

[Textile Printing Evaluation]

A solid image was printed on the nylon 6 jersey as the fabric with a printing paste having the following composition using a screen printing machine.

(Composition of Printing Paste)

| | |
|---|---|
| Paste: MEYPRO GUM NP [manufactured by Meyhall Chemical AG] | 50 g |
| pH adjuster: ammonium sulfate [manufactured by Wako Pure Chemical Industries, Ltd.] | 5 g |
| Colorant: dye shown in Table 3 below | 2 g |
| Water | 43 g |

The printed fabric was dried and then was treated with saturated steam at 105° C. Next, the fabric was washed with water to wash off a non-fixed portion of the dye. A fixing treatment was performed on the dyed fabric in a 200 mL bath including 0.1 g of acetic acid, 0.6 g of ammonium sulfate, and 6 g of SUNLIFE TN (a fixing agent, manufactured by Nicca Chemical Co., Ltd.) at 60° C. for 5 minutes, and the dyed fabric was dried. As a result, a dyed material was obtained. The evaluation results of the dyed material are shown in Table 3.

[Evaluation Method]

1. Evaluation of Color Optical Density (OD Value)

The printed solid image was evaluated using the same method as in the evaluation of the color optical density (OD value) of the dip dyeing evaluation described above.

2. Bleeding Evaluation

In the bleeding evaluation, a printing sample in which a character "Title" having a size of 1 cm×1 cm was printed instead of printing the solid image was evaluated by visual inspection based on the following criteria.

A: bleeding was not able to be visually recognized, and the character was clearly legible B: bleeding was recognized, and the character was slightly illegible 3. Light Fastness Evaluation The printed solid image was evaluated using the same method as in the light fastness evaluation of the dip dyeing evaluation described above.

TABLE 3

| | Dye | OD | Bleeding | Light Fastness $\Delta Eab$ |
|---|---|---|---|---|
| Example 11 | Exemplary Compound (1-1) | 1.4 | A | 7 |
| Example 12 | Exemplary Compound (1-2) | 1.4 | A | 6 |
| Example 13 | Exemplary Compound (1-3) | 1.4 | A | 7 |
| Example 14 | Exemplary Compound (1-4) | 1.4 | A | 6 |
| Example 15 | Exemplary Compound (1-5) | 1.4 | A | 6 |
| Example 16 | Exemplary Compound (1-6) | 1.4 | A | 6 |
| Comparative Example 5 | Comparative Compound C | 1.1 | B | 12 |

In addition, in the bleeding evaluation, the same results were obtained when a character "VIII" was printed instead of printing "Title" and was evaluated using the above-described method.

Separately, by using fabric made of silk, fabric made of wool, or nylon 66 jersey as the fabric instead of the nylon 6 jersey, textile printing was performed using the same method as described above. At this time, a dyed material which was dyed with magenta with a high density was obtained without color loss after water washing, and light fastness and wet fastness were also excellent.

[Ink Jet Textile Printing Evaluation]

Ink jet textile printing was performed using a method described in JP2013-209786A.

<Pre-Treatment Step>

As fabric, nylon 6 jersey was used. The following components were mixed with each other to prepare Pre-Treatment Agent A. The fabric was padded with Pre-Treatment Agent A obtained above at a squeezing rate of 90% and was naturally dried. As a result, pre-treated fabric was obtained.

(Pre-Treatment Agent A)

| Paste: guar gum [MEYPRO GUM NP, manufactured by Nissho Corporation] | 2 g |
|---|---|
| Hydrotropy agent: urea [manufactured by Wako Pure Chemical Industries, Ltd.] | 5 g |

-continued

| pH adjuster: ammonium sulfate [manufactured by Wako Pure Chemical Industries, Ltd.] | 4 g |
|---|---|
| Water | 89 g |

<Printing Step>

Next, an ink composition having the following composition was stirred for 1 hour while heated at 30° C. to 40° C. The obtained solution was filtered under reduced pressure through a microfilter having an average pore size of 0.5 μm. As a result, an ink solution for ink jet textile printing was prepared.

| Dye shown in Tables 4 and 5 | 5 mass % |
|---|---|
| Glycerin (manufactured by Wako Pure Chemical Industries, Ltd.; aqueous organic solvent) | 10 mass % |
| Diethylene glycol (manufactured by Wako Pure Chemical Industries, Ltd.; aqueous organic solvent) | 10 mass % |
| OLFINE E1010 (acetylenic glycol surfactant; manufactured by Nissin Chemical Co., Ltd.) | 1 mass % |
| Water | 74 mass % |

After setting each of the obtained ink solutions for ink jet textile printing in an ink jet printer (DMP-2381, manufactured by Dimatix Inc.), a solid image was printed on the pre-treated fabric.

A ratio of lithium ions to all the cations included in the ink solution for ink jet textile printing according to each of Examples 25 to 32 excluding cations of a cationic chromophore was 100 mol %.

<Post-Treatment Step>

After drying the printed fabric, saturated steam was applied to the printed fabric at 100° C. for 20 minutes in a steam treatment such that the dye was fixed on the fiber of the fabric. Next, the fabric was washed with cold water for 1 minute, was washed with warm water at 60° C. for 1 minute, and then was naturally dried.

[Evaluation Method]

1. Evaluation of Color Optical Density (OD Value)

The printed solid image was evaluated using the same method as in the evaluation of the color optical density (OD value) of the dip dyeing evaluation described above.

2. Bleeding Evaluation

In the bleeding evaluation, a printing sample in which a kana character "A" and a kanji character meaning "Title" were printed on the pre-treated fabric under conditions of font size: 10 and font: Gothic instead of printing the solid image was evaluated by visual inspection based on the following criteria. An allowable range is A or B. A contour portion of the image of the printing sample was observed by visual inspection to determine whether or not bleeding occurred.

A: bleeding was not able to be visually recognized, and the characters "A" and "Title" were clearly legible B: a small amount of bleeding was recognized, and the character "Title" was illegible C: bleeding was recognized, and the characters "A" and "Title" were illegible 3. Light Fastness Evaluation The printed solid image was evaluated using the same method as in the light fastness evaluation of the dip dyeing evaluation described above.

TABLE 4

| | Dye | OD | Bleeding | Light Fastness ΔEab |
|---|---|---|---|---|
| Example 17 | Exemplary Compound (1-1) | 1.4 | B | 7 |
| Example 18 | Exemplary Compound (1-2) | 1.4 | B | 6 |
| Example 19 | Exemplary Compound (1-3) | 1.4 | A | 6 |
| Example 20 | Exemplary Compound (1-4) | 1.4 | A | 6 |
| Example 21 | Exemplary Compound (1-5) | 1.4 | A | 6 |
| Example 22 | Exemplary Compound (1-6) | 1.4 | A | 6 |
| Example 23 | Exemplary Compound (1-7) | 1.4 | A | 7 |
| Example 24 | Exemplary Compound (1-8) | 1.4 | B | 6 |
| Comparative Example 6 | Comparative Compound C | 1.1 | C | 12 |
| Comparative Example 7 | Comparative Compound D | 1.2 | C | 14 |

TABLE 5

| | Dye | OD | Bleeding | Light Fastness ΔEab |
|---|---|---|---|---|
| Example 25 | Exemplary Compound (1-1Li) | 1.4 | B | 7 |
| Example 26 | Exemplary Compound (1-2Li) | 1.4 | B | 6 |
| Example 27 | Exemplary Compound (1-3Li) | 1.4 | A | 6 |
| Example 28 | Exemplary Compound (1-4Li) | 1.4 | A | 6 |
| Example 29 | Exemplary Compound (1-5Li) | 1.4 | A | 6 |
| Example 30 | Exemplary Compound (1-6Li) | 1.4 | A | 6 |
| Example 31 | Exemplary Compound (1-7Li) | 1.4 | A | 7 |
| Example 32 | Exemplary Compound (1-8Li) | 1.4 | B | 6 |

In addition, in the bleeding evaluation, the same results were obtained when a character "III" and a character "VIII" were printed instead of printing "A" and "Title" and were evaluated using the above-described method.

Regarding Exemplary Compound (1-1-1) to Exemplary Compound (1-1-7), the color optical density (OD value), the bleeding, and the light fastness (ΔEab) were the same as those of Exemplary Compound (1-1Li).

Regarding Exemplary Compound (1-2-1) to Exemplary Compound (1-2-7), the color optical density (OD value), the bleeding, and the light fastness (ΔEab) were the same as those of Exemplary Compound (1-2Li).

Regarding Exemplary Compound (1-3-1) to Exemplary Compound (1-3-7), the color optical density (OD value), the bleeding, and the light fastness (ΔEab) were the same as those of Exemplary Compound (1-3Li).

Regarding Exemplary Compound (1-4-1) to Exemplary Compound (1-4-7), the color optical density (OD value), the bleeding, and the light fastness (ΔEab) were the same as those of Exemplary Compound (1-4Li).

Regarding Exemplary Compound (1-5-1) to Exemplary Compound (1-5-7), the color optical density (OD value), the bleeding, and the light fastness (ΔEab) were the same as those of Exemplary Compound (1-5Li).

Regarding Exemplary Compound (1-6-1) to Exemplary Compound (1-6-7), the color optical density (OD value), the bleeding, and the light fastness (ΔEab) were the same as those of Exemplary Compound (1-6Li).

Regarding Exemplary Compound (1-7-1) to Exemplary Compound (1-7-7), the color optical density (OD value), the bleeding, and the light fastness (ΔEab) were the same as those of Exemplary Compound (1-7Li).

Regarding Exemplary Compound (1-8-1) to Exemplary Compound (1-8-7), the color optical density (OD value), the bleeding, and the light fastness (ΔEab) were the same as those of Exemplary Compound (1-8Li).

In a case where the inks used in Examples 17 to 32 and Comparative Examples 6 and 7 were printed on plain paper instead of nylon, no bleeding occurred in all the examples.

Separately, by using fabric made of silk, fabric made of wool, or nylon 66 jersey as the fabric instead of the nylon 6 jersey, ink jet textile printing was performed on each of the fabrics using the method described in JP2013-209786A. At this time, a dyed material which was dyed with magenta with a high density was obtained without color loss after water washing, and light fastness and wet fastness were also excellent.

[Evaluation of Ink Storage Stability]

<Preparation of Ink 1 and Ink 2>

An ink composition having the following composition was stirred for 1 hour while heated at 30 to 40° C. The obtained solution was filtered under reduced pressure through a microfilter having an average pore size of 0.5 μm. As a result, an ink solution for ink jet textile printing (Ink 1 and Ink 2) was prepared.

| <Ink 1> | |
|---|---|
| Dye or dye mixture shown in Table 6 | 10 mass % |
| Water | 90 mass % |
| <Ink 2> | |
| Dye or dye mixture shown in Table 6 | 5 mass % |
| Glycerin (manufactured by Wako Pure Chemical Industries, Ltd.; aqueous organic solvent) | 10 mass % |
| Diethylene glycol (manufactured by Wako Pure Chemical Industries, Ltd.; aqueous organic solvent) | 10 mass % |
| OLFINE E1010 (acetylenic glycol surfactant; manufactured by Nissin Chemical Co., Ltd.) | 1 mass % |
| Water | 74 mass % |

After Ink 1 and Ink 2 were stored at −20° C. for 1 week, precipitates were observed, and the viscosity was measured. Regarding Ink 2, after setting Ink 2 in an ink jet printer (DMP-2381, manufactured by Dimatix Inc.), a solid image was printed on plain paper. In a case where little precipitates were observed, an increase in viscosity was small, and blurring of a printed material was small, the ink storage stability was evaluated as excellent.

[Evaluation Method]

1. Precipitates

A: No precipitates were observed

B: Precipitates were observed

2. Viscosity of Ink

A: An increase in viscosity after storage was lower than 10% with respect to the viscosity before storage B: An increase in viscosity after storage was 10% or higher and lower than 25% with respect to the viscosity before storage C: An increase in viscosity after storage was 25% or higher with respect to the viscosity before storage 3. Blurring of Printed Matter A: No blurring was observed on a printed image B: Blurring was observed on a printed image C: An image was not able to be printed

TABLE 6

| | | Ink 1 | | Ink 2 | | Blurring of Printed Material |
|---|---|---|---|---|---|---|
| | Dye or Dye Mixture | Precipitate | Viscosity | Precipitate | Viscosity | |
| Example 101 | Exemplary Compound (1-1Li) | A | A | A | A | A |
| Example 102 | Exemplary Compound (1-1-7) | A | A | A | B | A |
| Example 103 | Exemplary Compound (1-2Li) | A | A | A | A | A |
| Example 104 | Exemplary Compound (1-3Li) | A | A | A | A | A |
| Example 105 | Exemplary Compound (1-3-7) | A | A | A | B | A |
| Example 106 | Exemplary Compound (1-4Li) | A | A | A | A | A |
| Example 107 | Exemplary Compound (1-5Li) | A | A | A | A | A |
| Example 108 | Exemplary Compound (1-5-7) | A | A | A | B | A |
| Example 109 | Exemplary Compound (1-6Li) | A | A | A | A | A |
| Example 110 | Exemplary Compound (1-7Li) | A | A | A | A | A |
| Example 111 | Exemplary Compound (1-7-7) | A | A | A | B | A |
| Example 112 | Exemplary Compound (1-8Li) | A | A | A | A | A |
| Example 113 | Comparative Compound C/ Exemplary Compound (1-1Li) (Mass Ratio = 1/1) | A | A | A | B | A |
| Comparative Example 8 | Comparative Compound C | B | C | B | C | C |

The results of Exemplary Compound (1-1-1) to Exemplary Compound (1-1-6) were the same as those of Exemplary Compound (1-1Li).

The results of Exemplary Compound (1-2-1) to Exemplary Compound (1-2-7) were the same as those of Exemplary Compound (1-2Li).

The results of Exemplary Compound (1-3-1) to Exemplary Compound (1-3-6) were the same as those of Exemplary Compound (1-3Li).

The results of Exemplary Compound (1-4-1) to Exemplary Compound (1-4-7) were the same as those of Exemplary Compound (1-4Li).

The results of Exemplary Compound (1-5-1) to Exemplary Compound (1-5-6) were the same as those of Exemplary Compound (1-5Li).

The results of Exemplary Compound (1-6-1) to Exemplary Compound (1-6-7) were the same as those of Exemplary Compound (1-6Li).

The results of Exemplary Compound (1-7-1) to Exemplary Compound (1-7-6) were the same as those of Exemplary Compound (1-7Li).

The results of Exemplary Compound (1-8-1) to Exemplary Compound (1-8-7) were the same as those of Exemplary Compound (1-8Li).

INDUSTRIAL APPLICABILITY

According to the present invention, a coloring composition for dyeing or textile printing having an excellent color, a high color optical density, reduced bleeding, and excellent light fastness can be provided. In addition, an ink for ink jet textile printing including the above-described coloring composition for dyeing or textile printing, a method of printing on fabric, and a dyed or printed fabric can be provided.

The present invention has been described in detail with reference to the specific embodiment. However, it is obvious to those skilled in the art that various modifications and changes can be made within a range not departing from the scope of the present invention.

The present application is based on Japanese Patent Application (JP2014-237961) filed on Nov. 25, 2014 and Japanese Patent Application (JP2015-171439) filed on Aug. 31, 2015, the entire content of which is incorporated herein by reference.

What is claimed is:

1. A coloring composition for textile printing, comprising a compound represented by any one of the following Formulas (1-1) to (1-6) and (1-1Li) to (1-6Li):

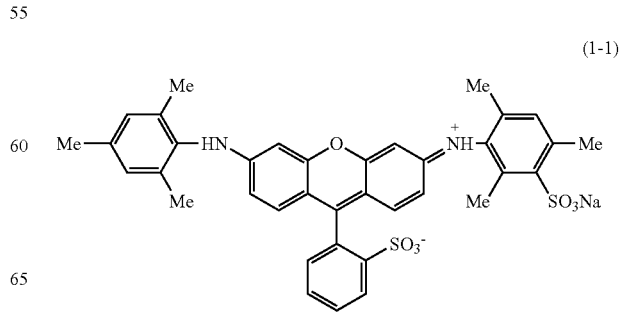

(1-2)
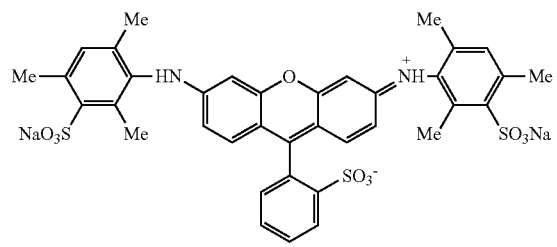

(1-3)
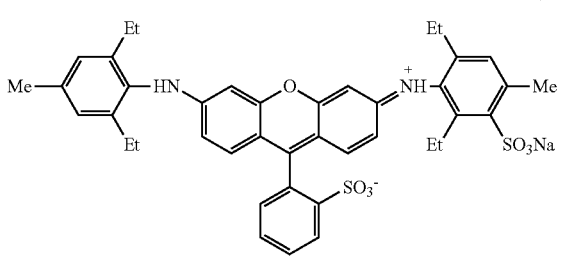

(1-4)
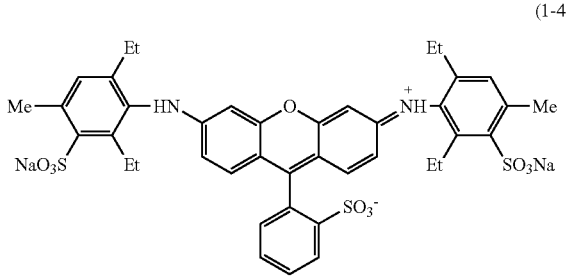

(1-5)
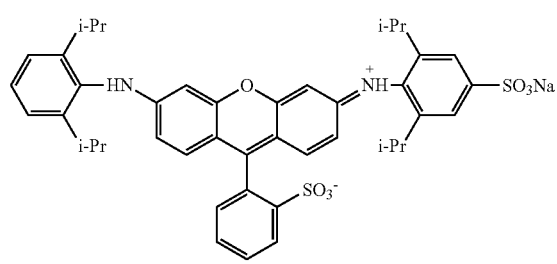

(1-6)
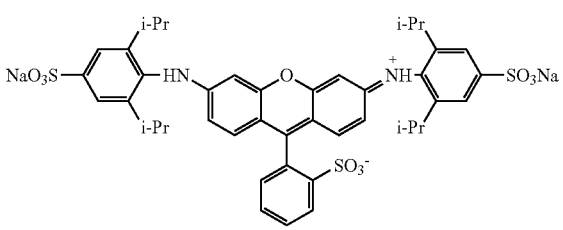

(1-1Li)
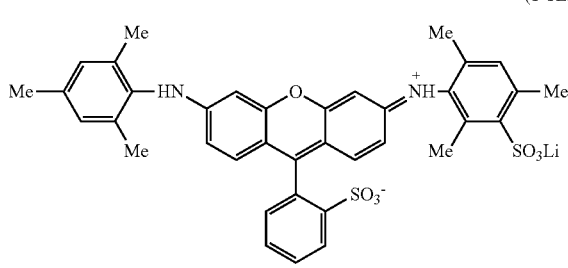

(1-2Li)
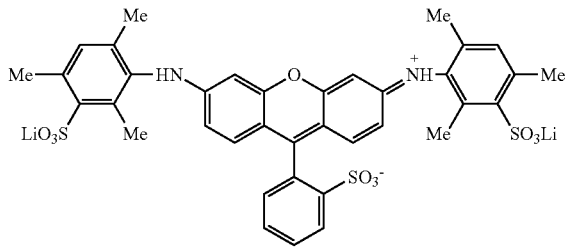

(1-3Li)
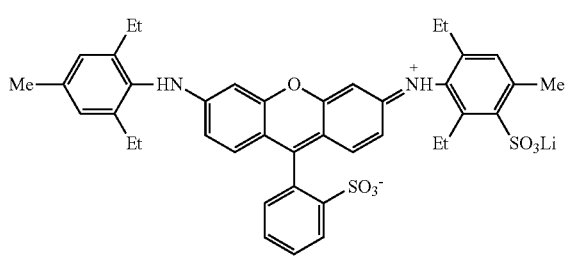

(1-4Li)
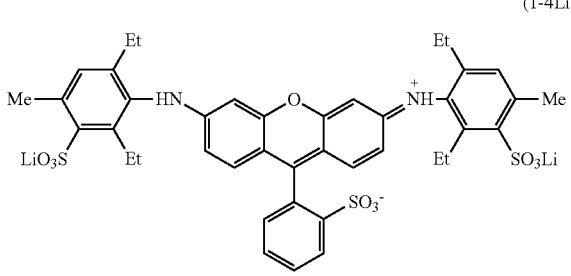

(1-5Li)
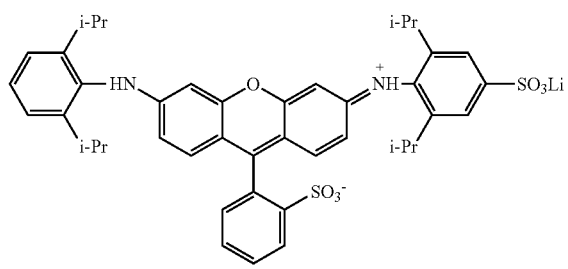

(1-6Li)
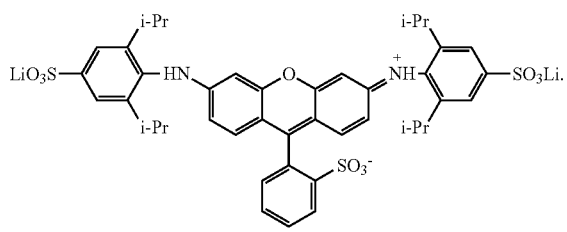

2. The coloring composition for textile printing according to claim 1,
wherein 10 mol % or higher of all the cations included in the coloring composition for printing excluding cations of a cationic chromophore are lithium ions.

3. A fabric which is printed using the coloring composition for printing according to claim 2.

4. A textile printing method comprising the following steps (1) to (4):

(1) a step of preparing a color paste by adding the coloring composition for textile printing according to claim 1 to a solution including at least a polymer compound and water;
(2) a step of printing the color paste of (1) on fabric;
(3) a step of applying steam to the printed fabric; and
(4) a step of washing the printed fabric with water and drying the washed fabric.

5. The textile printing method according to claim 4, wherein the fabric includes polyamide.

6. A fabric which is printed using the textile printing method according to claim 4.

7. An ink for ink jet textile printing comprising the coloring composition for textile printing according to claim 1.

8. A textile printing method of printing the ink for ink jet textile printing according to claim 7 on fabric using an ink jet method.

9. A textile printing method comprising the following steps (11) to (14):
(11) a step of applying a paste including at least a polymer compound and water to fabric;
(12) a step of printing the ink for ink jet textile printing according to claim 8 on the fabric using an ink jet method;
(13) a step of applying steam to the printed fabric; and
(14) a step of washing the printed fabric with water and drying the washed fabric.

10. A fabric which is printed using the coloring composition for printing according to claim 1.

11. A compound represented by any one of the following Formulae (1-1) to (1-6) and (1-1Li) to (1-6Li):

(1-1)

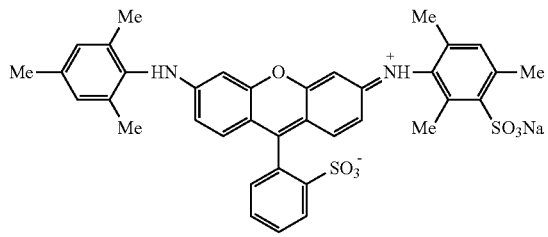

(1-2)

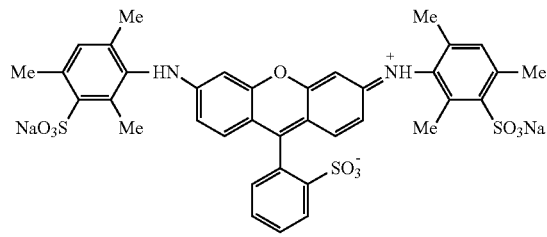

(1-3)

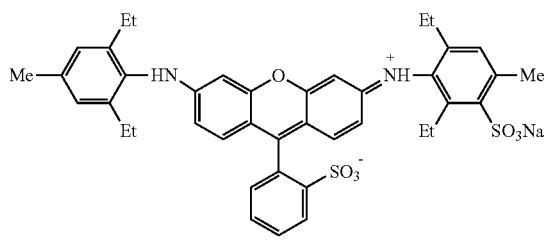

(1-4)

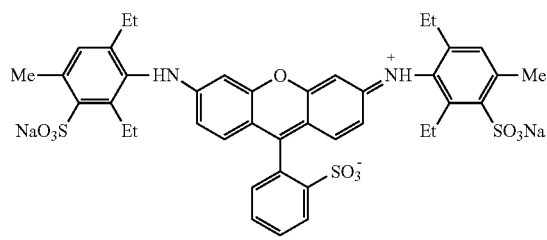

(1-5)

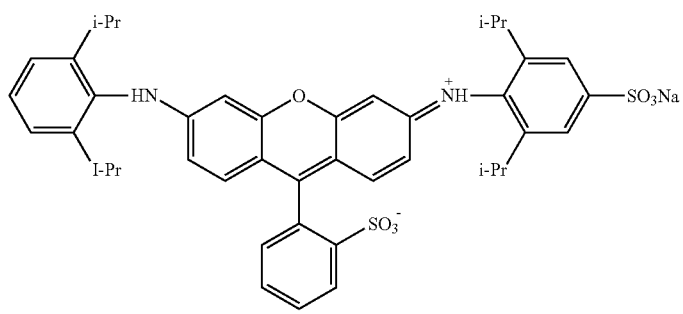

(1-6)

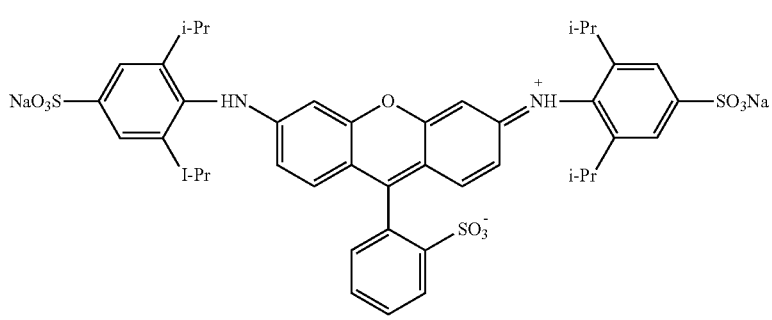

-continued
(1-1Li)
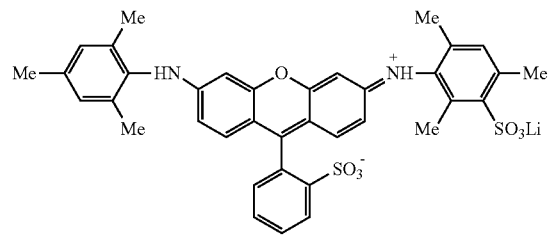
(1-2Li)
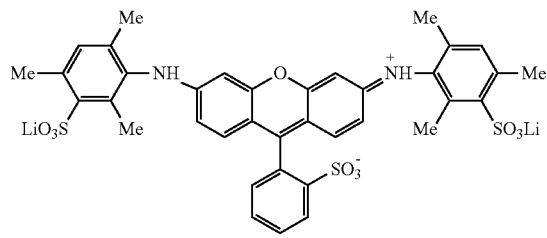
(1-3Li)
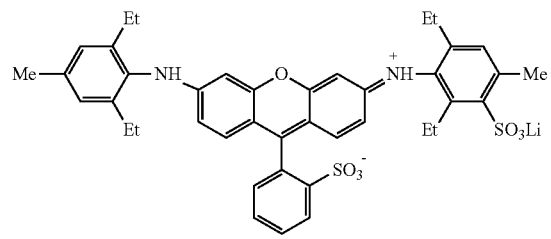
(1-4Li)
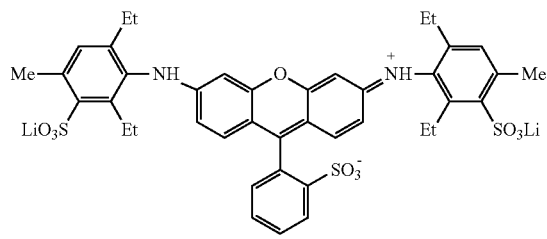
(1-5Li)
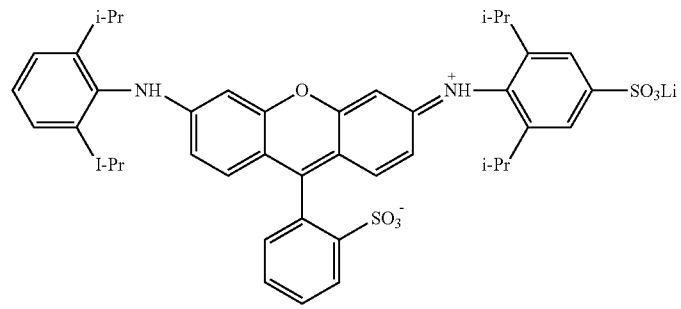
(1-6Li)
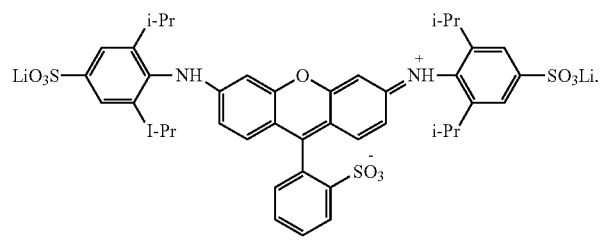
* * * * *